US011398083B2

(12) United States Patent
Tora et al.

(10) Patent No.: US 11,398,083 B2
(45) Date of Patent: Jul. 26, 2022

(54) ANALYSIS DEVICE, ANALYSIS METHOD, AND ANALYSIS PROGRAM

(71) Applicant: NIPPON TELEGRAPH AND TELEPHONE CORPORATION, Tokyo (JP)

(72) Inventors: Shotaro Tora, Musashino (JP); Yoshitaka Nakamura, Musashino (JP); Machiko Toyoda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 72 days.

(21) Appl. No.: 16/499,870

(22) PCT Filed: Mar. 30, 2018

(86) PCT No.: PCT/JP2018/013937
§ 371 (c)(1),
(2) Date: Oct. 1, 2019

(87) PCT Pub. No.: WO2018/186314
PCT Pub. Date: Oct. 11, 2018

(65) Prior Publication Data
US 2020/0057906 A1 Feb. 20, 2020

(30) Foreign Application Priority Data

Apr. 3, 2017 (JP) .............................. JP2017-074052
Apr. 3, 2017 (JP) .............................. JP2017-074053
(Continued)

(51) Int. Cl.
*G06V 10/44* (2022.01)
*G06K 9/62* (2022.01)
(Continued)

(52) U.S. Cl.
CPC .......... *G06V 10/44* (2022.01); *G06F 11/3476* (2013.01); *G06K 9/6267* (2013.01); *G06N 5/048* (2013.01)

(58) Field of Classification Search
CPC ........ G06F 11/07; G06F 11/079; G06F 11/30; G06F 11/34; G06F 11/3476; G06F 16/35; G06K 9/4604; G06K 9/6267; G06N 5/048
See application file for complete search history.

(56) References Cited

U.S. PATENT DOCUMENTS

2017/0228265 A1   8/2017  Kimura et al.

FOREIGN PATENT DOCUMENTS

| GB | 2478066 A | 8/2011 |
| JP | 2016-081371 A | 5/2016 |
| WO | 2016/031681 A1 | 3/2016 |

OTHER PUBLICATIONS

Extended European Search Report dated Jan. 13, 2021 in European Patent Application No. 18781016.3, 9 pages.
(Continued)

*Primary Examiner* — Manuchehr Rahmjoo
(74) *Attorney, Agent, or Firm* — Xsensus LLP

(57) ABSTRACT

A classification unit classifies messages included in a text log depending on types, and gives an ID set for each type to each of the classified messages. A creation unit creates, based on dates of occurrence attached to the messages, a matrix indicating an appearance distribution of the messages in the text log for each predetermined duration for each ID. A pattern extraction unit extracts a plurality of patterns, which are combinations of the IDs, from the matrix created by the creation unit. A removal unit removes a part or whole of the patterns from the matrix. A determination unit calculates a degree of importance for each element included in each of the patterns, and determines whether the degree of
(Continued)

importance is equal to or higher than a predetermined threshold. A sequence extraction unit extracts a sequence.

5 Claims, 19 Drawing Sheets

(30) Foreign Application Priority Data

Apr. 3, 2017 (JP) .............................. JP2017-074054
Apr. 3, 2017 (JP) .............................. JP2017-074055

(51) Int. Cl.
*G06N 5/04* (2006.01)
*G06F 11/34* (2006.01)

(56) References Cited

OTHER PUBLICATIONS

International Search Report and Written Opinion dated Jun. 5, 2018 for PCT/JP2018/013937 filed on Mar. 30, 2018, 6 pages including English Translation of the International Search Report.

Yamanishi, K., "Anomaly detection with data mining", Kyoritsu Shuppan Co., Ltd., 2009, 15 pages.

Sawada, H., "Nonnegative matrix factorization and its applications to data/signal analysis", IEICE magazine, Sep. 2012, IEICE 2012, vol. 95, No. 9, 22 pages.

Kimura, T. et al., "Spatio-temporal Factorization of Log Data for Understanding Network Events", IEEE Infocom 2014—IEEE Conference on Computer Communications IEEE, 2014, 5 pages.

Tora, S. et al., "The 7th Forum on Data Engineering and Information Management", non-official translation, A consideration on interval change of time frame in convolutive NMF, The 13th Annual Meeting of DBSJ), Mar. 4, 2015, retrieved at URL<http://db-event.jpn.org/deim2015/paper/242.pdf>, retrieved on May 22, 2018, 7 pages.

FIG.2

```
2016/12/01T15:01:31 LINK-UP Gigabitethernet 0/0/0
2016/12/01T15:01:53 network_monitor:[INFO]:network monitor detection started.
2016/12/01T15:02:13 LINK-DOWN Gigabitethernet 0/2/5
2016/12/01T15:02:36 LINK-UP Gigabitethernet 0/2/5
2016/12/01T15:02:45 network_monitor:[WARNING]:network monitor detected traffic-delay(0.5 sec).
2016/12/01T15:03:16 network_monitor:[WARNING]:neworkmonitor detected congestion in some port.
2016/12/01T15:04:12 LINK-UP Interface 1/0/17
2016/12/01T15:04:22 network_monitor:[WARNING]:network monitor detected traffic-delay(2.0 sec).
2016/12/01T15:05:55 LINK-UP Interface 0/0/0
2016/12/01T15:06:37 traffic_manager:[ERROR]:traffic couldn't transferred. retry within 10 seconds.
2016/12/01T15:06:44 traffic_manager:[INFO]:traffic transferred.
2016/12/01T15:09:38 LINK-DOWN Interface 0/0/0
2016/12/01T15:09:54 network_monitor:[INFO]:network monitor detection finished.
...
```

| ID | TEMPLATE |
|---|---|
| ... | ... |
| 601 | LINK-UP Interface * |
| 602 | LINK-UP Gigabitethernet * |
| 603 | LINK-DOWN Interface * |
| 604 | LINK-DOWN Gigabitethernet * |
| ... | ... |
| 701 | network_monitor: [INFO] : network monitor detection started. |
| 702 | network_monitor: [INFO] : network monitor detection finished. |
| 703 | traffic_manager: [INFO] : traffic transferred. |
| 704 | network_monitor: [WARNING] : network monitor detected traffic-delay(* sec). |
| 705 | network_monitor: [WARNING] : neworkmonitor detected congestion in some port. |
| 706 | traffic_manager: [ERROR] : traffic couldn't transferred. retry within * seconds. |
| ... | ... |

FIG.4
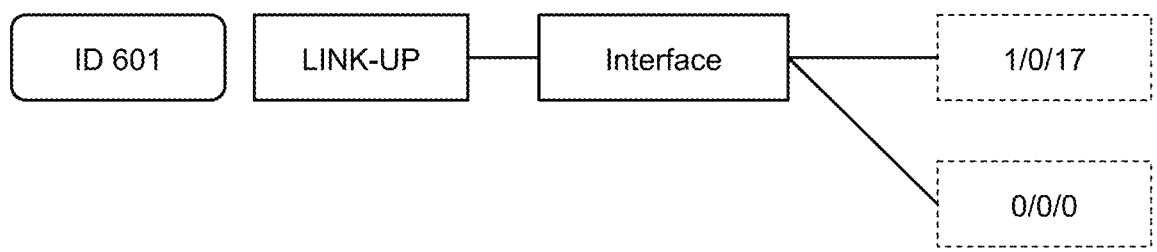
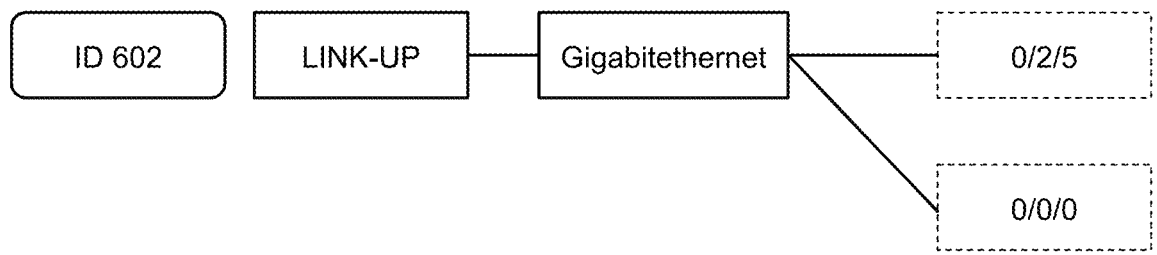

TIME(INTERVALS OF ONE HOUR×ONE MONTH)

| ID | TEMPLATE |
|---|---|
| ... | ... |
| 651 | LINK-UP * |
| 652 | LINK-DOWN * |
| ... | ... |
| 751 | network_monitor: [INFO] * |
| 752 | network_monitor: [WARNING] * |
| 753 | traffic_manager: [ERROR] * |
| ... | ... |

US 11,398,083 B2

ANALYSIS DEVICE, ANALYSIS METHOD, AND ANALYSIS PROGRAM

CROSS-REFERENCE TO RELATED APPLICATIONS

The present application is based on PCT filing PCT/JP2018/013937, filed Mar. 30, 2018, which claims priority to Japanese Patent Application Nos. 2017-074052, 2017-074053, 2017-074054, and 2017-074055, filed on Apr. 3, 2017, the entire contents of each are incorporated herein by reference.

FIELD

The present invention relates to an analysis device, an analysis method, and an analysis program.

BACKGROUND

System monitoring using text logs such as syslog and management information base (MIB) information has been conventionally performed for anomaly detection and state analysis in server systems and network systems. For example, when a fault has occurred in a system, text logs are manually searched by a particular keyword, and a message including the keyword is extracted as a critical message.

CITATION LIST

Non Patent Literature

Non Patent Literature 1: Kenji Yamanishi, "Anomaly detection with data mining", 2009, Kyoritsu Shuppan
Non Patent Literature 2: Hiroshi Sawada, "Nonnegative Matrix Factorization and Its Applications to Data/Signal Analysis", The journal of the Institute of Electronics, Information and Communication Engineers, Vol. 95 No. 9, pp. 829-833, September, 2012
Non Patent Literature 3: Tatsuaki Kimura, et al. "Spatio-temporal factorization of log data for understanding network events." IEEE INFOCOM 2014-IEEE Conference on Computer Communications. IEEE, 2014.

SUMMARY

Technical Problem

The conventional system monitoring using text logs, however, has a problem in that it is difficult to efficiently analyze a massive amount of text logs to obtain useful information. For example, when the number of types and amount of text logs are massive due to scaling and complication of system configurations, it is difficult to manually perform efficient analysis. When a critical message is to be extracted by searching with a particular keyword, useful information included in a message not extracted may be overlooked.

Solution to Problem

To solve the problems as described above, an analysis device, includes: a classification unit configured to classify messages included in a text log output from a system for each type, and give an ID set for each type to each of the classified messages; a creation unit configured to create, based on dates of occurrence attached to the messages, a matrix indicating an appearance distribution of the messages in the text log for each predetermined duration for each ID; a pattern extraction unit configured to extract a plurality of patterns, which are combinations of the IDs, from the matrix created by the creation unit; a removal unit configured to remove a part or whole of the patterns from the matrix; a determination unit configured to calculate a degree of importance for each element included in each of the patterns, and determines whether the degree of importance is equal to or higher than a predetermined threshold; and an information extraction unit configured to extract, from the text log, predetermined information on an element whose degree of importance has been determined by the determination unit to be equal to or higher than the predetermined threshold.

To solve the problems as described above, an analysis method to be executed by an analysis device, the analysis method includes: a step of classifying messages included in a text log output from a system for each type, and giving an ID set for each type to each of the classified messages; a step of creating, based on dates of occurrence attached to the messages, a matrix indicating an appearance distribution of the messages in the text log for each predetermined duration for each ID; a step of extracting a plurality of patterns, which are combinations of the IDs, from the matrix created at the step of creating; a step of removing a part or whole of the patterns from the matrix; a step of calculating a degree of importance for each element included in each of the patterns, and determining whether the degree of importance is equal to or higher than a predetermined threshold; and a step of extracting, from the text log, predetermined information on an element whose degree of importance has been determined at the step of determining to be equal to or higher than the predetermined threshold.

Advantageous Effects of Invention

According to the present invention, a massive amount of text logs can be efficiently analyzed to obtain useful information.

BRIEF DESCRIPTION OF DRAWINGS

FIG. 2 is a diagram illustrating an example of text logs according to the first embodiment.
FIG. 3 is a diagram illustrating an example of a data configuration of dictionary information according to the first embodiment.
FIG. 4 is a diagram for describing creation of templates according to the first embodiment.

FIG. 12 is a diagram for describing removal of frequent patterns according to the first embodiment.

FIG. 18 is a diagram illustrating an example of a data configuration of dictionary information according to other embodiments.

DESCRIPTION OF EMBODIMENTS

An analysis device, an analysis method, and an analysis program according to embodiments of the present application are described in detail below with reference to the drawings. The present invention is not limited by the embodiments described below.

Configuration in First Embodiment

Figure 1:
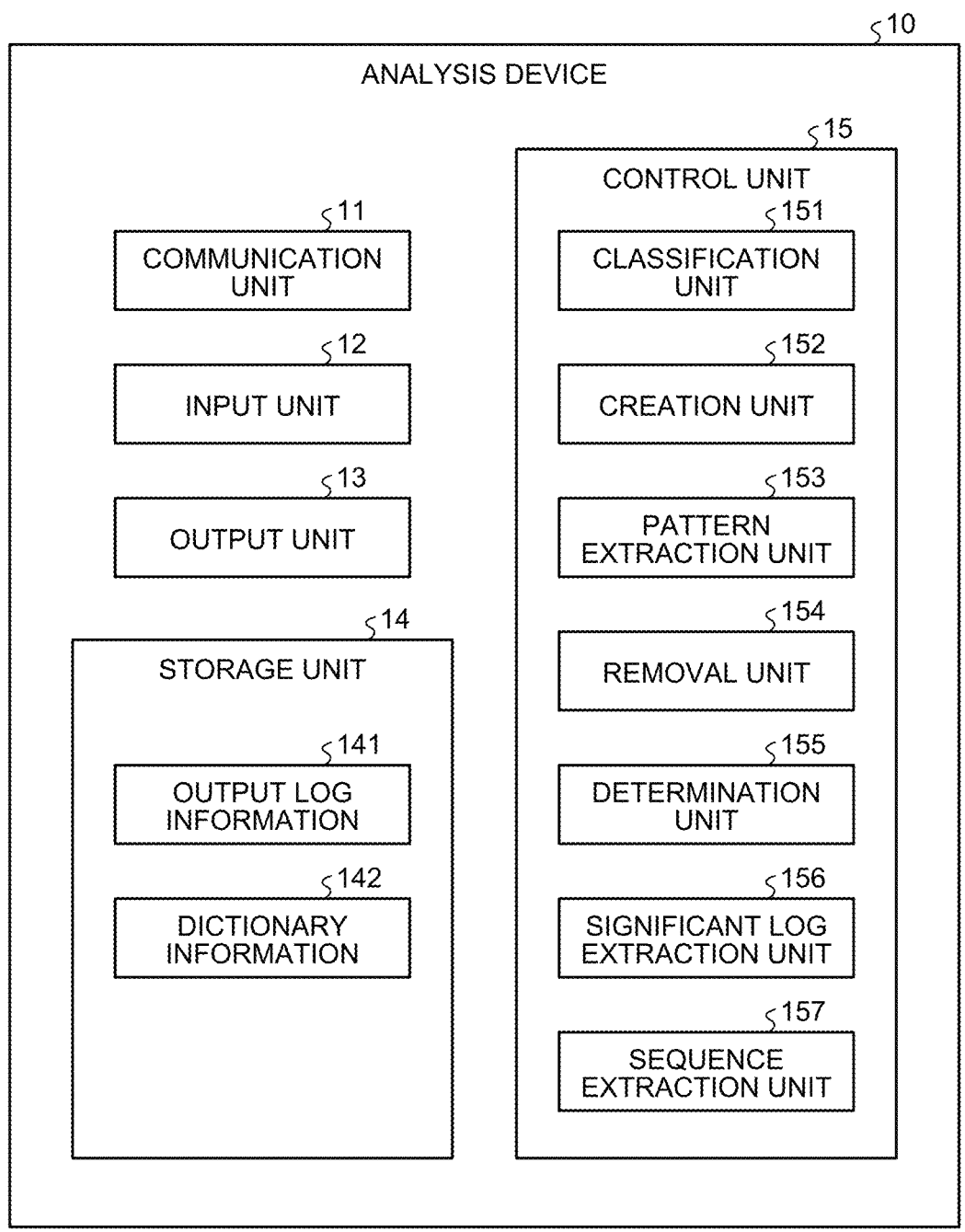
FIG. 1 is a diagram illustrating an example of a configuration of an analysis device according to a first embodiment.

First, a configuration of an analysis device according to a first embodiment is described with reference to FIG. 1. FIG. 1 is a diagram illustrating an example of the configuration of the analysis device according to the first embodiment. As illustrated in FIG. 1, an analysis device 10 includes a communication unit 11, an input unit 12, an output unit 13, a storage unit 14, and a control unit 15.

The communication unit 11 communicates data with other devices through a network. For example, the communication unit 11 is a network interface card (NIC). The input unit 12 receives inputs of data from a user. For example, the input unit 12 is an input device such as a mouse and a keyboard. The output unit 13 outputs data by display on a screen. For example, the output unit 13 is a display device such as a display.

The storage unit 14 is a storage device such as a hard disk drive (HDD), a solid state drive (SSD), and an optical disc. Note that the storage unit 14 may be a data rewritable semiconductor memory such as a random access memory (RAM), a flash memory, and a non-volatile static random access memory (NVSRAM). The storage unit 14 stores therein an operating system (OS) and various kinds of computer programs to be executed by the analysis device 10. The storage unit 14 further stores therein various kinds of information used for the execution of computer programs. The storage unit 14 stores output log information 141 and dictionary information 142 therein.

The storage unit 14 stores text logs output from a system as the output log information 141. For example, text logs are output from a server machine, a personal computer, and a storage constituting a computer system. For example, text logs are output from a router, a firewall, a load balancer, an optical transmission device, and an optical transmission relay constituting a network system. Output text logs may relate to the overall system, and may relate to a device constituting a system. Furthermore, text logs may be output from environments where a computer system and a network system are virtualized.

Text logs may be output from a plant, a generator, and a machine tool. Text logs may be output from vehicle devices such as a vehicle, an airplane, and a train. Text logs may be output from compact electronic devices such as home electrical appliances, mobile phones, and smartphones. Text logs may be output from sensor devices for measuring biological bodies such as humans and animals and biological information on the biological bodies.

Examples of the text logs include OS syslog, execution logs of applications and databases, error logs, operation logs, MIB information obtained from network devices, alerts of a monitoring system, activity logs, and operating state logs.

FIG. 2 is a diagram illustrating an example of a text log according to the first embodiment. As illustrated in FIG. 2, each record of a text log 51 includes a message and the date of occurrence attached to the message. For example, the first record of the text log 51 includes a message "LINK-UP Gigabitethernet 0/0/0" and the date of occurrence "2016/12/01T15:01:31". Note that the message may include additional information such as a host and a log level.

The storage unit 14 stores data for classifying messages of the text log as the dictionary information 142. FIG. 3 is a diagram illustrating an example of a data configuration of the dictionary information according to the first embodiment. As illustrated in FIG. 3, the dictionary information 142 includes IDs and templates. The ID is information for identifying the type in which a message of the text log is classified. The template is a character string used to classify a message of the text log. For example, whether a message is classified to a type with an ID "601" is determined by using a template "LINK-UP Interface*". Note that the classification of messages using the dictionary information 142 is performed by a classification unit 151. Specific processing by the classification unit 151 is described later.

The control unit 15 controls the overall analysis device 10. For example, the control unit 15 is an electronic circuit such as a central processing unit (CPU) and a micro processing unit (MPU) or an integrated circuit such as an application specific integrated circuit (ASIC) and a field programmable gate array (FPGA). The control unit 15 has an internal memory for storing therein computer programs and control data defining various processing procedure, and executes processing by using the internal memory. When various computer programs operate, the control unit 15 functions as various processing units. For example, the control unit 15 includes the classification unit 151, a creation unit 152, a pattern extraction unit 153, a removal unit 154, a determination unit 155, a significant log extraction unit 156, and a sequence extraction unit 157.

The classification unit 151 classifies messages included in a text log output from a system for each type, and gives an ID set for each type to each of the classified messages. Each of the classified messages is hereinafter referred to as "template". As described above, the classification unit 151 performs the classification by using the dictionary information 142.

The dictionary information 142 may be created by the classification unit 151. For example, the classification unit 151 can create a template based on a character string obtained by deleting a parameter from a message. Referring to FIG. 4, a method of creating a template based on a text log is described. FIG. 4 is a diagram for describing the creation of a template according to the first embodiment.

As illustrated in FIG. 4, for example, the classification unit 151 can regard a character string expressed by "numeral/numeral/numeral" as a parameter, and use a character string obtained by deleting the parameter from a message as a template. In this case, the classification unit 151 creates a template "LINK-UP Interface" from a message "LINK-UP Interface 1/0/17" or a message "LINK-UP Interface 0/0/0" included in the text log 51 in FIG. 2. Furthermore, the classification unit 151 sets an ID to the created template, and adds the template to the dictionary information 142 in the storage unit 14. In this case, the classification unit 151 may add a wild card such as "*" to a part from which the parameter has been deleted.

Note that the character string regarded as a parameter by the classification unit 151 is not limited to the above-mentioned example. For example, the classification unit 151 may regard all numerals as parameters, and may regard a character string indicating an address as a parameter. When a message that does not match any template is found during the classification of messages, the classification unit 151 may create a new template based on the message.

In the first embodiment, templates in the dictionary information 142 are not necessarily required to be created by the classification unit 151, and may be created by a user in advance or may be automatically created by a device other than the analysis device 10.

The classification unit 151 classifies a message in a text log by determining whether a template in the dictionary information 142 matches the message. In this case, the classification unit 151 determines that a template matches a message when the template exactly matches the message or partially matches the message. The classification unit 151 gives the message an ID of the template determined to match.

For example, a template "LINK-UP Gigabitethernet*" with an ID "602" in FIG. 3 partially matches a message "LINK-UP Gigabitethernet 0/0/0" in the first line of the text log 51 in FIG. 2, and hence the classification unit 151 determines that the template "LINK-UP Gigabitethernet*" matches the message "LINK-UP Gigabitethernet 0/0/0", and gives the ID "602" to the message "LINK-UP Gigabitethernet 0/0/0".

For example, a template "network_monitor:[INFO]:network monitor detection started." with an ID "701" in FIG. 3 exactly matches a message "network_monitor:[INFO]:network monitor detection started." in the second line of the text log 51 in FIG. 2, and hence the classification unit 151 determines that the template "network_monitor:[INFO]:network monitor detection started." matches the message "network_monitor:[INFO]:network monitor detection started.", and gives the ID "701" to the message "network_monitor:[INFO]:network monitor detection started.".

The creation of templates and the determination of matching with messages are not limited to the above-mentioned methods, and may be performed by a machine learning algorithm such as clustering. For example, the above-mentioned determination may be performed by a known method regarding log clustering (Reference document 1: Japanese Patent Application Laid-open No. 2015-36891).

Figure 5:
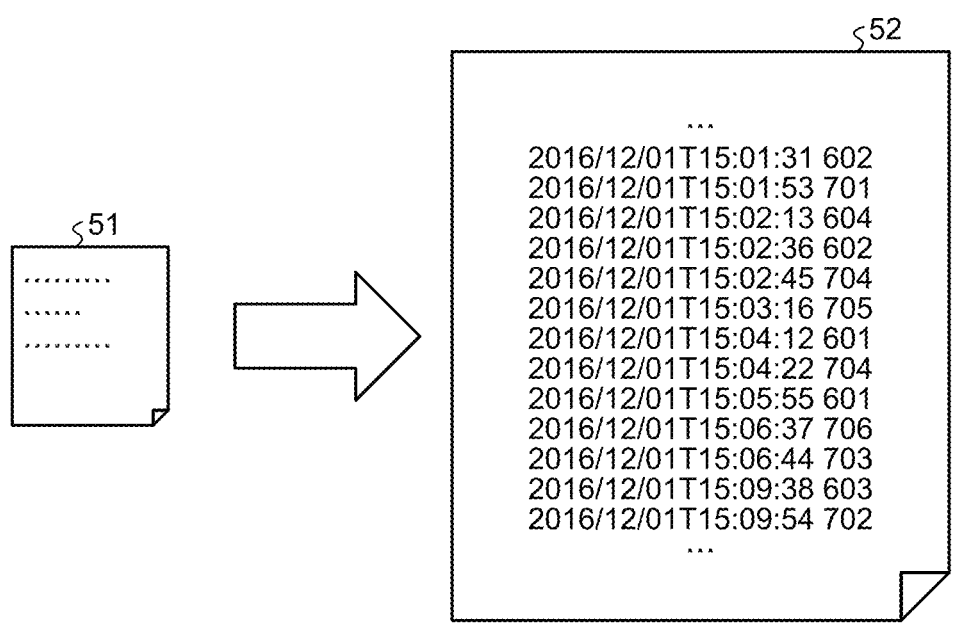
FIG. 5 is a diagram illustrating an example of a classified text log according to the first embodiment.

The classification unit 151 classifies messages and gives IDs to create a classified text log 52. FIG. 5 is a diagram illustrating an example of a classified text log according to the first embodiment. As illustrated in FIG. 5, each record in the classified text log 52 includes an ID and the date of occurrence of a message. For example, a record in the first line of the classified text log 52 includes an ID "602" given to the message "LINK-UP Gigabitethernet 0/0/0" and the date of occurrence "2016/12/01T15:01:31". For example, a record in the second line of the classified text log 52 includes an ID "701" given to the message "network_monitor:[INFO]:network monitor detection started." and the date of occurrence "2016/12/01T15:01:53".

The message "LINK-UP Gigabitethernet 0/0/0" in the first line and the message "LINK-UP Gigabitethernet 0/2/5" in the fourth line in FIG. 2 are different from each other, but both the messages match the template "LINK-UP Gigabitethernet*", and hence the classification unit 151 gives the ID "602" to both the messages.

Based on the dates of occurrence attached to the messages, the creation unit 152 creates a log matrix that is a matrix indicating an appearance distribution of the messages in the text log 51 for each predetermined duration for each ID. Specific examples of the appearance distribution include, but not limited to, the frequency of appearance of each ID, values processed by taking the logarithm of the frequency of appearance, and the presence/absence of appearance (value of 1 for appearance and 0 for non-appearance). In the following embodiment, an example in which the frequency of appearance is used as the appearance distribution is described. The creation unit 152 acquires the dates of occurrence and IDs of messages used to create a log matrix from the classified text log 52.

Figure 6:
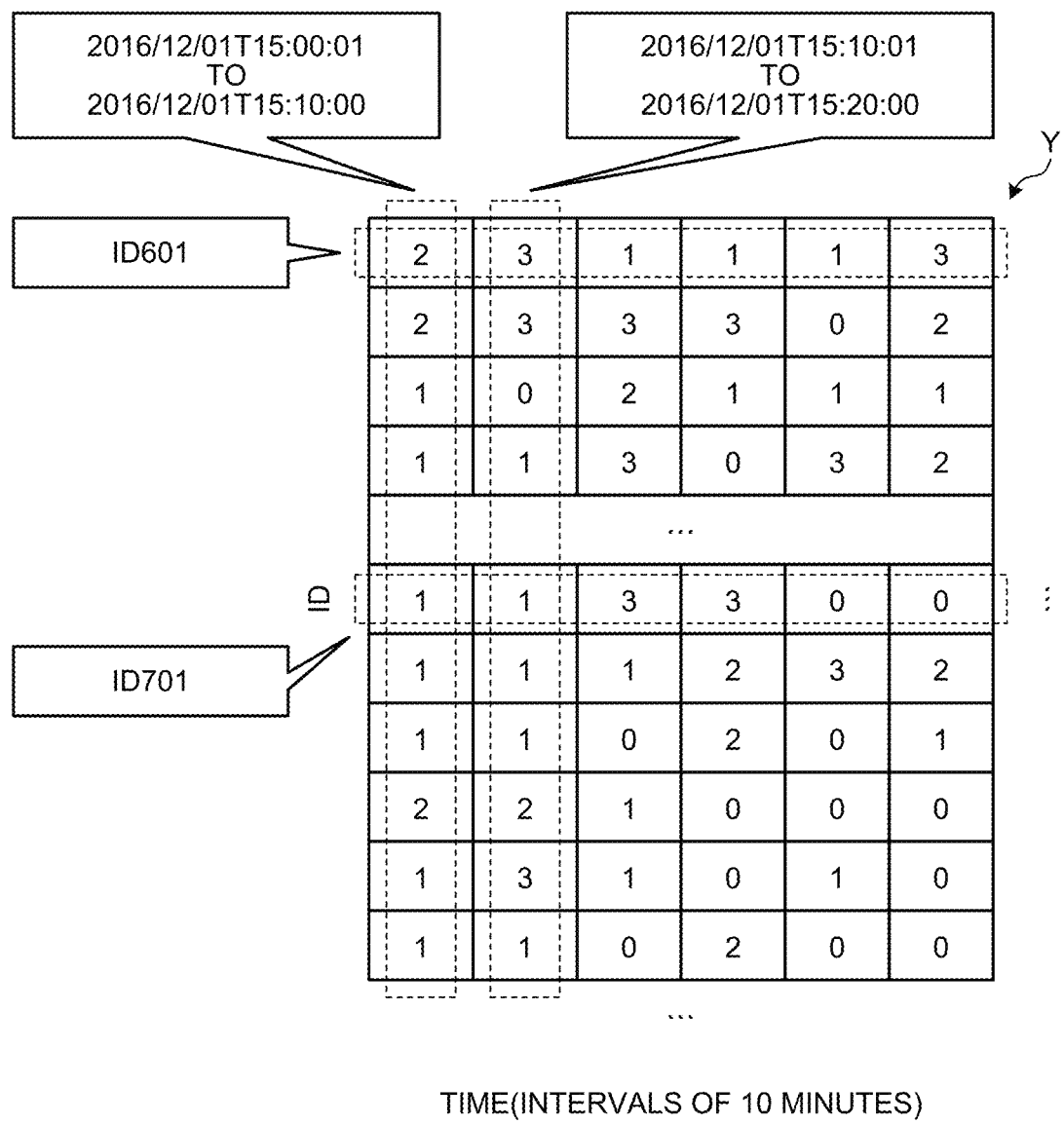
FIG. 6 is a diagram illustrating an example of a log matrix according to the first embodiment.

FIG. 6 is a diagram illustrating an example of a log matrix according to the first embodiment. Each row in the log matrix corresponds to an ID in the dictionary information 142. Each column in the log matrix corresponds to predetermined date and time of 10 minutes. In the following description, the rows on the upper part of a log matrix Y illustrated in FIG. 6 are 601st to 604th rows, and the rows on the lower part are 701st to 706th rows. An element in the p row and the q column in the log matrix Y is represented by an element (p,q). For example, the value of an element (601,1) in the log matrix Y is "2".

The 601st row in the log matrix Y corresponds to the ID "601". The 602nd row in the log matrix Y corresponds to the ID "602". The 701st row in the log matrix Y corresponds to the ID "701". The 702nd row in the log matrix Y corresponds to the ID "702". The first column in the log matrix Y corresponds to 10 minutes between 2016/12/01T15:00:01 and 2016/12/01T15:10:00. The second column in the log matrix Y corresponds to 10 minutes between 2016/12/01T15:10:01 and 2016/12/01T15:20:00. In FIG. 5, all IDs and dates of occurrence of messages with the dates of occurrence ranging from 2016/12/01T15:00:01 to 2016/12/01T15:10:00 are illustrated.

In the log matrix, the row number and the ID are not necessarily required to match each other as long as it can be grasped which ID corresponds to each row. In the log matrix, IDs and times need not be consecutive, and there may be a missing ID or time.

The creation unit 152 counts the number of occurrences of messages every 10 minutes for each ID, and sets the counted number to the value of each element in the log matrix Y. For example, as illustrated in FIG. 5, the number of messages with the ID "601" is two among the messages with the dates of occurrence ranging from 2016/12/01T15:00:01 to 2016/12/01T15:10:00. Thus, as illustrated in FIG. 6, the creation unit 152 sets the value of the element (601,1) in the log matrix Y to "2". For example, as illustrated in FIG. 5, the number of messages with the ID "701" is one among the messages with the dates of occurrence ranging from 2016/12/01T15:00:01 to 2016/12/01T15:10:00. Thus, as illustrated in FIG. 6, the creation unit 152 sets the value of the element (701,1) in the log matrix Y to "1". Similarly, the creation unit 152 counts the numbers of occurrences of messages for each ID and each duration, and sets the value of each element in the log matrix Y.

Figure 7:
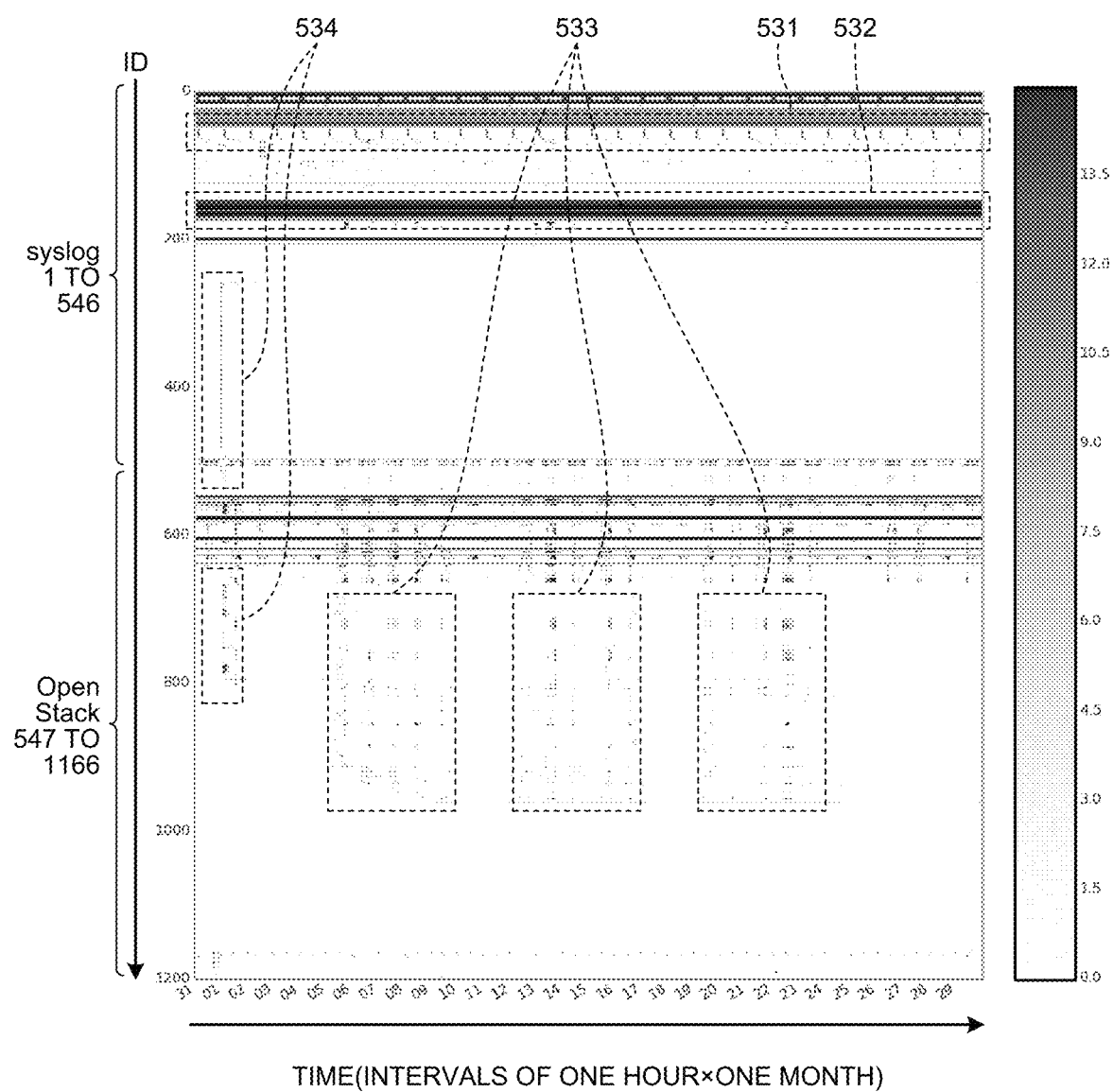
FIG. 7 is a diagram illustrating an example of an image visualizing text logs in one month as a log matrix with a duration of one hour according to the first embodiment.

The output unit 13 outputs an image visualizing the log matrix Y. FIG. 7 is a diagram illustrating an example of an image visualizing a text log for one month as a log matrix having a duration of one hour according to the first embodiment. The vertical axis in FIG. 7 represents IDs. The horizontal axis in FIG. 7 represents time. In FIG. 7, an element having a higher appearance distribution of messages is indicated by a darker color.

The log matrix Y may be created based on a plurality of text logs with different properties. For example, the log matrix Y may be created based on a text log output in accordance with syslog and a text log output from an OpenStack system. Even in such cases, the output unit 13 can visualize the log matrix Y as one image as illustrated in FIG. 7.

In a region 531 in FIG. 7, a text log is output every day, and hence it is understood that an ID group based on regular processing such as daily processing appears. Similarly, in a region 532, an ID group based on processing constantly executed appears. In a region 533, a text log is output for five days excluding two days, and hence it is understood that an ID group based on processing related to business tasks on weekdays appears. On the other hand, in this system, a system failure occurred on the second day, and an ID group seems to have been output due to the failure appears in a region 534. Thus, it is important to extract particularly the ID group appearing in the region 534 for anomaly detection.

The pattern extraction unit 153 extracts a combination of IDs as a pattern from the log matrix created by the creation unit 152. Specifically, the pattern extraction unit 153 decomposes the log matrix by nonnegative matrix factorization (NMF), and extracts, as patterns, a basis matrix having a pattern as a combination of IDs in a column vector and a weighting matrix having a row vector indicating how frequently the pattern appears for each predetermined duration. It is known that the matrix decomposition by NMF has characteristics that a pattern appearing relatively frequently is extracted. Note that the method of matrix decomposition is not limited to only NMF, and methods such as principal component analysis and independent component analysis can be used.

Note that, in the case where a matrix includes only non-negative values, methods such as non-negative principal component analysis and non-negative independent component analysis can be used as the method of matrix decomposition.

Figure 8:
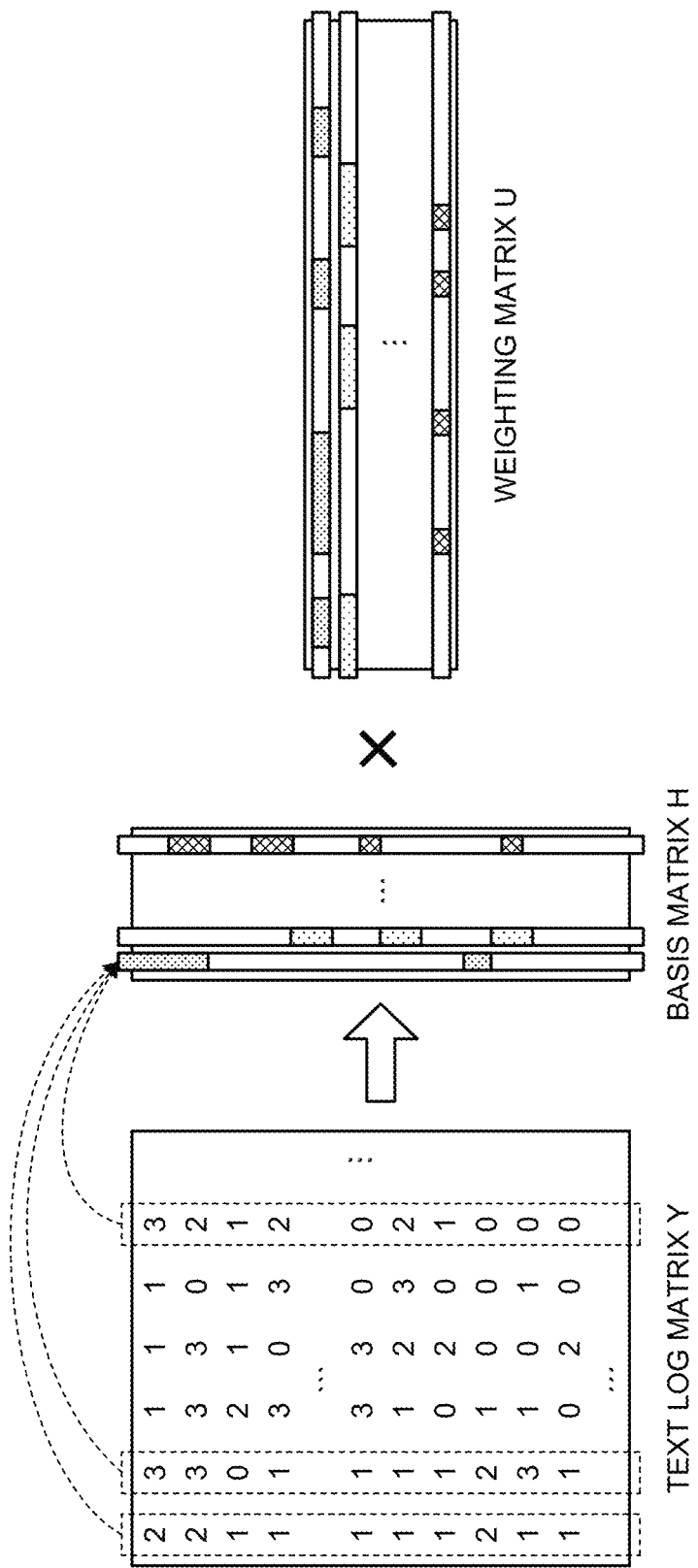
FIG. 8 is a diagram for describing decomposition of a log matrix according to the first embodiment.

First, the decomposition of a log matrix is described with reference to FIG. 8. FIG. 8 is a diagram for describing the decomposition of a log matrix according to the first embodiment. The pattern extraction unit 153 uses NMF to decompose a log matrix Y into a basis matrix H and a weighting matrix U. For example, the pattern extraction unit 153 can perform NMF by the method disclosed in Non Patent Literature 2. Note that the log matrix Y, the basis matrix H, and the weighting matrix U in the first embodiment correspond to a matrix X, a matrix T, and a matrix V described in Non Patent Literature 2, respectively. The relation of the log matrix Y, the basis matrix H, and the weighting matrix U can be expressed by Equation (1) where E is an error matrix.

$$Y = HU + E \qquad (1)$$

Each row in the basis matrix H corresponds to each row in the log matrix Y, that is, an ID. Each column in the weighting matrix U corresponds to each column in the log matrix Y, that is, a duration. Each column in the basis matrix H and each row in the weighting matrix U correspond to each pattern as a combination of IDs. In one example, the number of columns in the basis matrix H in the first embodiment is 10, and basis numbers 1 to 10 are set as combinations of IDs appearing in the first to 10th columns in the basis matrix H.

It can be said that the basis matrix H indicate which ID is included and to what degree the ID is included in a pattern as a combination of IDs corresponding to a message group repeatedly appearing concurrently. It can be said that the weighting matrix U indicates to what degree and in which time zone a pattern as a combination of IDs appearing in each column of the basis matrix H has occurred.

Figure 9:
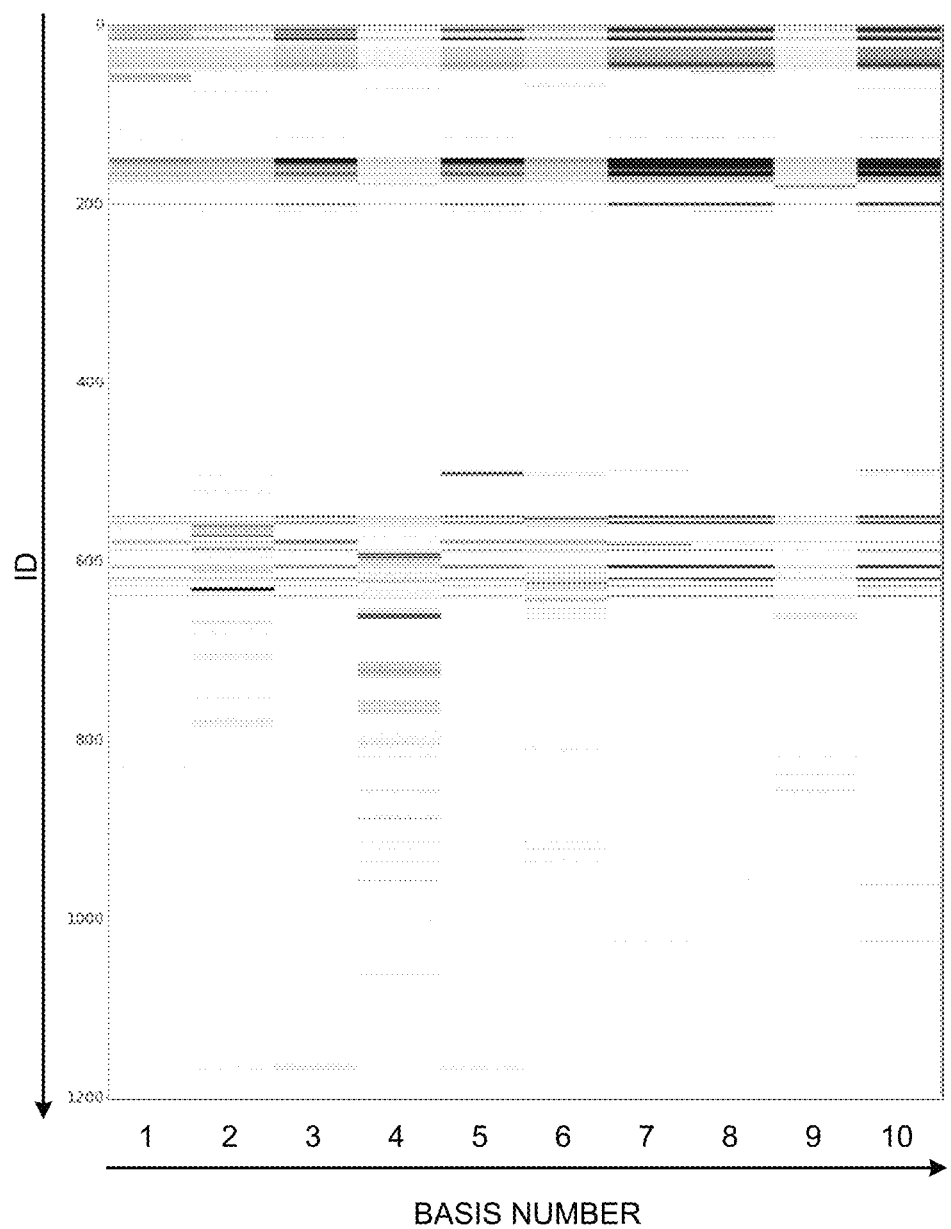
FIG. 9 is a diagram illustrating an example of an image visualizing a basis matrix according to the first embodiment.

The output unit 13 can output an image visualizing the basis matrix H as illustrated in FIG. 9. FIG. 9 is a diagram illustrating an example of an image visualizing a basis matrix according to the first embodiment, illustrating a basis matrix obtained by executing NMF on the log matrix in FIG. 7. It is confirmed from FIG. 9 that an ID group constantly appearing in the log matrix as in the region 532 in FIG. 7 is included in any of the patterns of the basis numbers 1 to 10. For example, the pattern of the basis number 1 includes the ID group in the region 531 in FIG. 7. The pattern of the basis number 4 includes the ID group in the region 533. In this manner, the frequently appearing ID groups are extracted as patterns, but a less frequently appearing ID group (such as a failure) as in the region 534 in FIG. 7 is not extracted.

Figure 10:
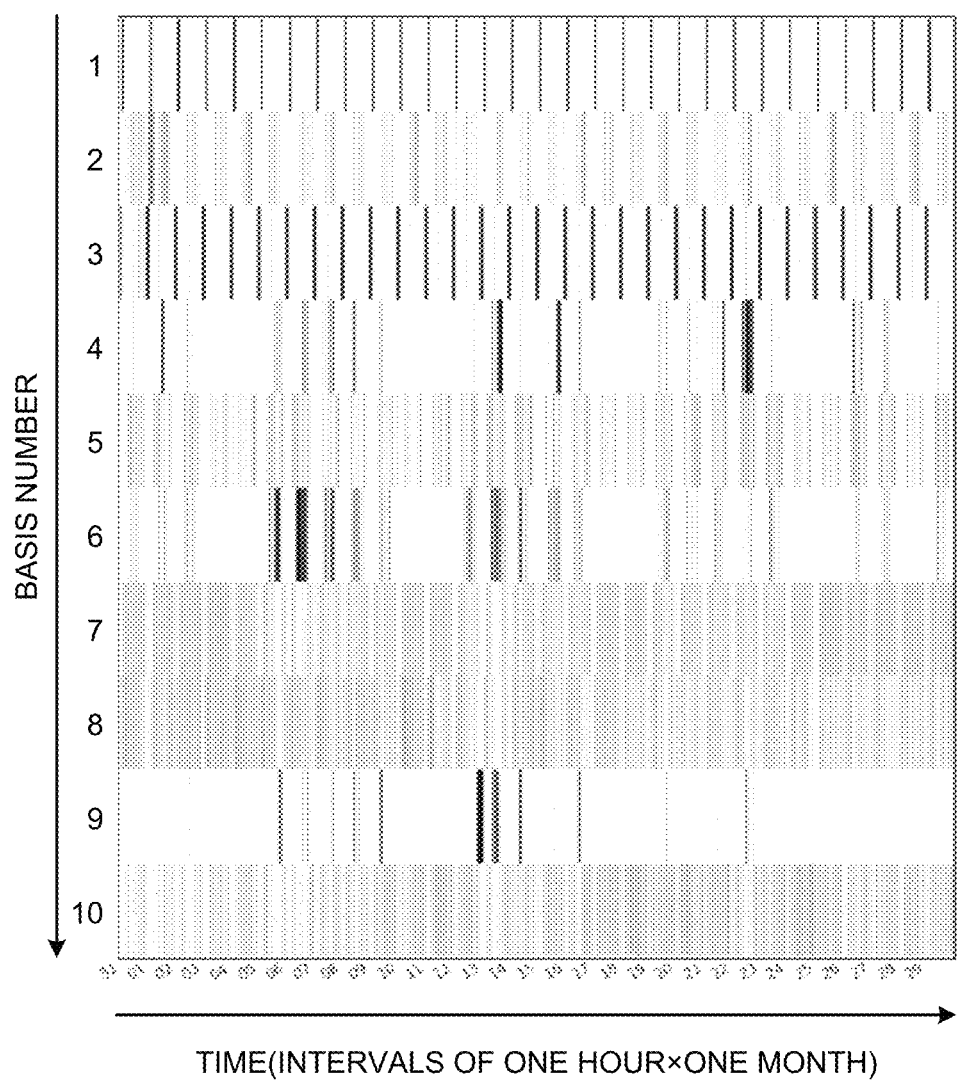
FIG. 10 is a diagram illustrating an example of an image visualizing a weighting matrix according to the first embodiment.

The output unit 13 can output an image visualizing the weighting matrix U as illustrated in FIG. 10. FIG. 10 is a diagram illustrating an example of an image visualizing a weighting matrix according to the first embodiment, illustrating a weighting matrix obtained by executing NMF on the log matrix in FIG. 7. As illustrated in FIG. 10, the pattern of the basis number 1 is a pattern appearing every day, which matches the confirmation from FIG. 9 that this pattern includes an ID group of daily processing. The pattern of the basis number 4 appears five times with long intervals after five times of the appearance and appears weekdays, which matches the confirmation from FIG. 9 that this pattern includes IDs related to weekday business tasks. The patterns appearing weekdays correspond to the basis numbers 6 and 9 in addition to the basis number 4. On the other hand, it is understood that the patterns of the basis numbers 7, 8, and 10 are patterns constantly appearing.

The appearance timings of frequently appearing ID groups, such as ID groups periodically appearing and ID groups constantly appearing are clearly indicated in FIG. 10. On the other hand, the appearance timings of ID groups occurring based on anomaly, such as a failure, as in the region 534 in FIG. 7 are not clearly indicated in FIG. 10. The ID group included in the region 534 in FIG. 7 is not indicated in FIG. 9, and it is understood that the ID group has not been extracted as a pattern.

The removal unit 154 removes frequent patterns from the log matrix. Specifically, the removal unit 154 removes patterns by subtracting, from the log matrix, any one of the product of the basis matrix and a significant weighting matrix obtained by replacing the values of elements in each pattern in the weighting matrix smaller than a predetermined threshold with 0, the product of a significant basis matrix obtained by replacing the values of elements in each pattern in the basis matrix smaller than a predetermined threshold with 0 and the weighting matrix, and the product of the significant basis matrix and the significant weighting matrix. Note that, when an element in the log matrix becomes minus after the calculation, the element can be replaced with 0 to be a non-negative value.

For example, the removal unit 154 removes frequent patterns from the log matrix by Equation (2). Y is a log matrix, H is a basis matrix, U is a weighting matrix, and E is an error matrix. Y is decomposed into HU and E. $H_{freq}$ is a matrix obtained by replacing, for each column in H, the value in a row smaller than a predetermined threshold with 0, that is, a significant basis matrix. $U_{freq}$ is a matrix obtained by replacing, for each row in U, the value in a column smaller than a predetermined threshold with 0, that is, a significant weighting matrix. $Y'_{e1}$ is a log matrix from which the frequent patterns have been removed.

$$Y'_{e1} = Y - H_{e1} U_{e1} \qquad (2)$$

where $$H_{e1} = \begin{Bmatrix} H \\ H_{freq} \end{Bmatrix}, U_{e1} = \begin{Bmatrix} U \\ U_{freq} \end{Bmatrix}$$

As expressed by Equation (2), $H_{e1}$ is H or $H_{freq}$. $U_{e1}$ is U or $U_{freq}$. When $H_e$ is H, $U_{e1}$ is $U_{freq}$, and when $U_{e1}$ is U, $H_{e1}$ is $H_{freq}$. In other words, $H_{e1}U_{e1}$ in Equation (2) includes at least one of the significant basis matrix and the significant weighting matrix. In this manner, $H_{e1}U_{e1}$ in Equation (2) is expressed by any one of $H_{freq}U$, $HU_{freq}$, and $H_{freq}U_{freq}$.

For example, when $H_{e1}$ is H and $U_{e1}$ is $U_{freq}$, the removal unit 154 removes frequent patterns by using Equation (3). Note that Y' is a log matrix from which the frequent patterns have been removed, that is, $Y'_{e1}$.

$$\begin{aligned} Y' &= Y - HU_{freq} \qquad (3) \\ &= HU + E - HU_{freq} \\ &= H(U - U_{freq}) + E \end{aligned}$$

Figure 11:
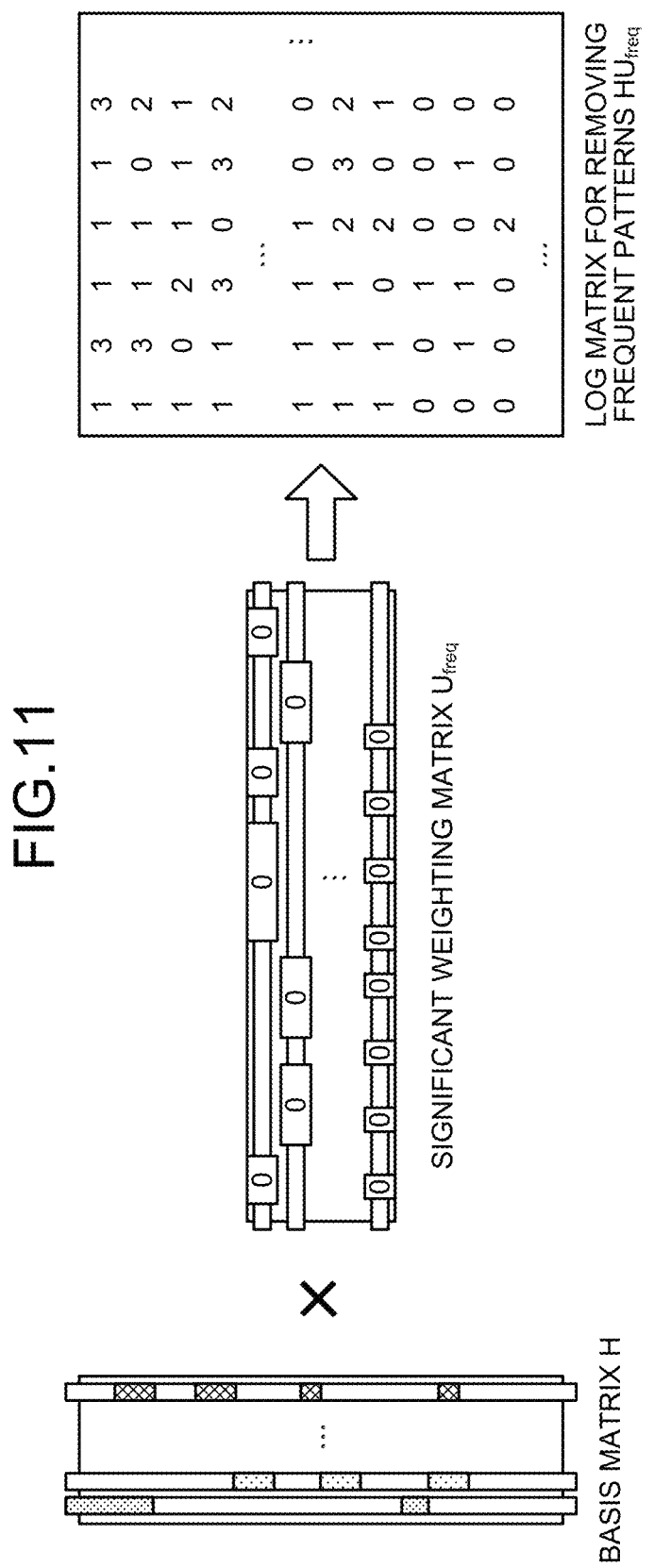
FIG. 11 is a diagram for describing removal of frequent patterns according to the first embodiment.
Figure 12:
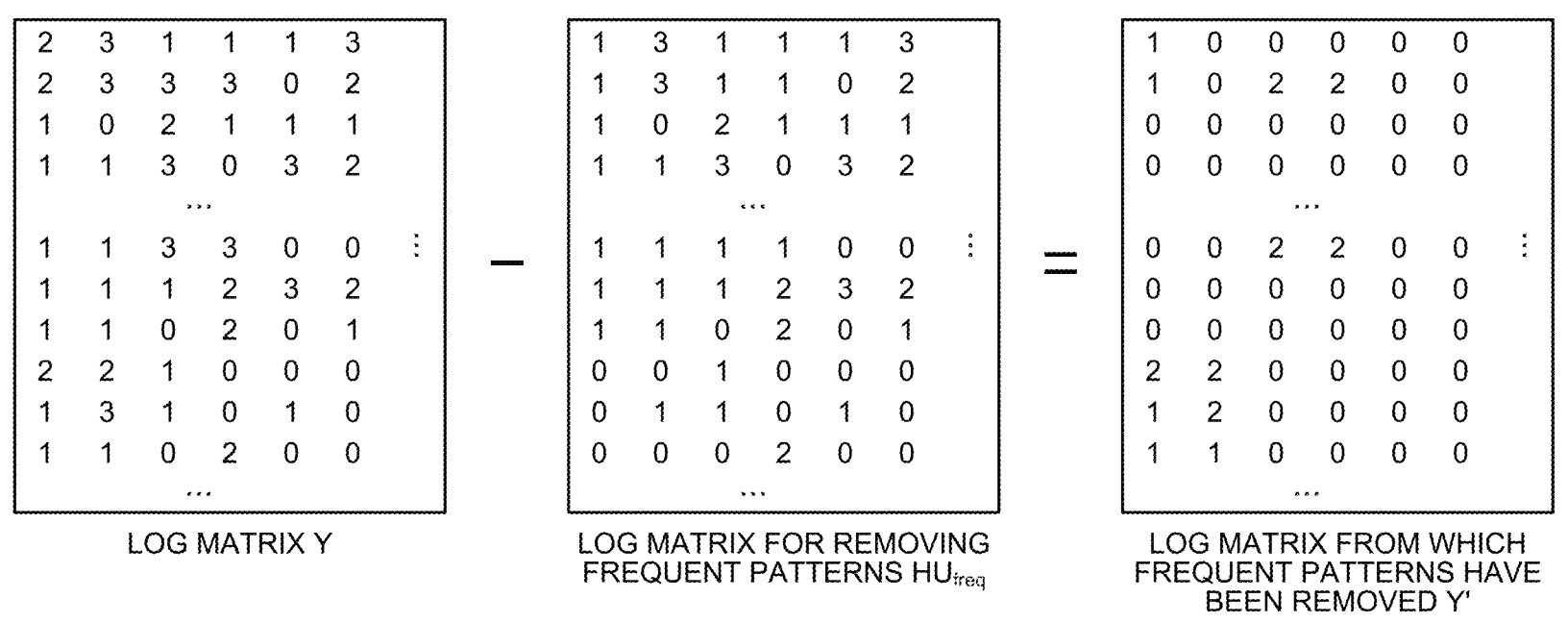

FIGS. 11 and 12 are diagrams for describing the removal of frequent patterns according to the first embodiment. An example in which a basis matrix and a significant weighting matrix are used to remove frequent patterns by Equation (3) is described. As illustrated in FIG. 11, first, the removal unit 154 calculates the product $HU_{freq}$ of the basis matrix H and the significant weighting matrix $U_{freq}$ in which the values of elements not to be removed are 0.

Next, as illustrated in FIG. 12, the removal unit 154 subtracts, from the log matrix Y, the log matrix $HU_{freq}$ for removing frequent patterns. In this manner, the removal unit 154 obtains a log matrix Y' from which the frequent patterns have been removed. The pattern extraction unit 153 further extracts frequent patterns from the log matrix from which the frequent patterns have been removed by the removal unit 154. In this case, a basis matrix and a weighting matrix extracted from the log matrix Y' by the pattern extraction unit 153 are H' and U', respectively.

Figure 13:
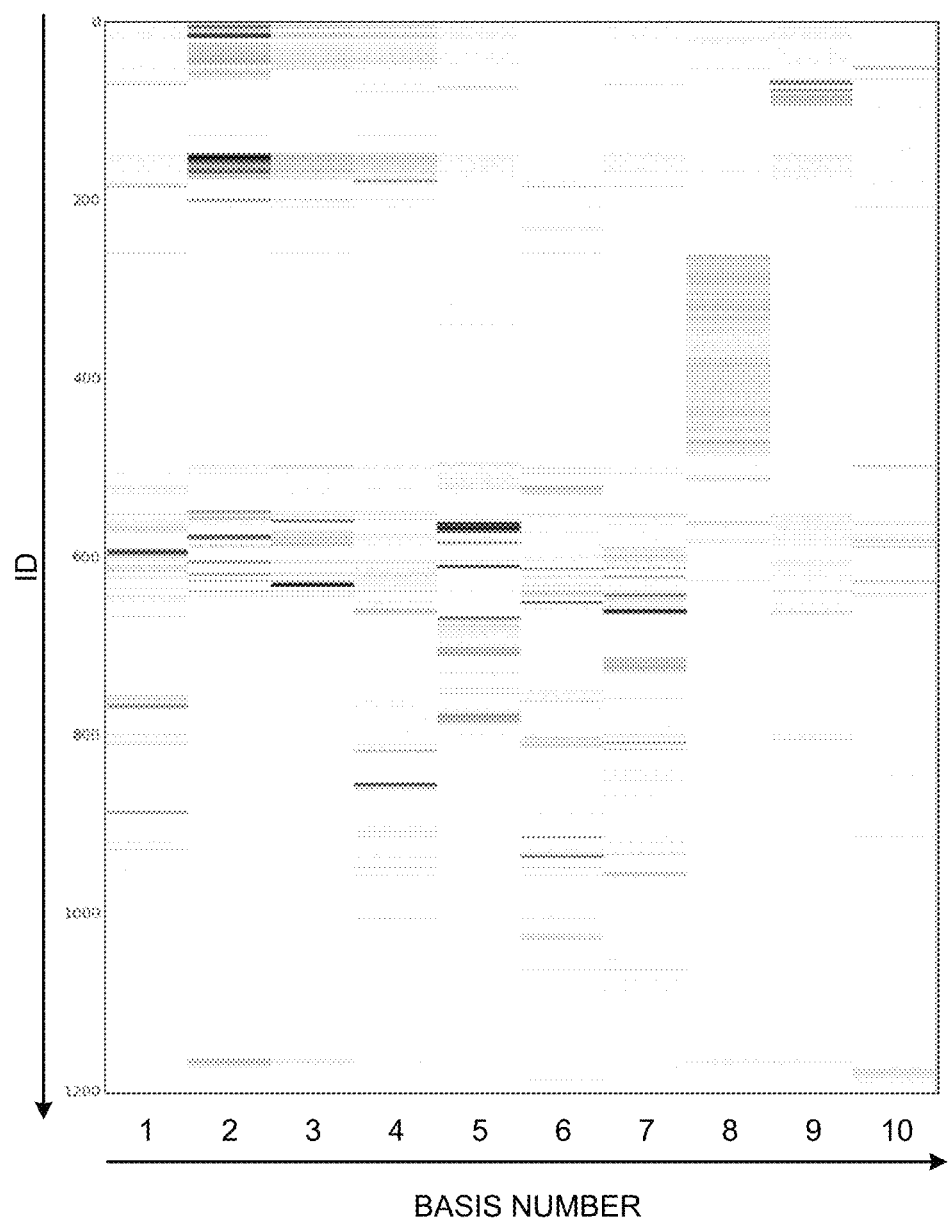
FIG. 13 is a diagram illustrating an example of an image visualizing a basis matrix from which frequent patterns have been removed according to the first embodiment.

The output unit 13 can output an image visualizing the basis matrix H' as illustrated in FIG. 13. FIG. 13 is a diagram illustrating an example of an image visualizing a basis matrix from which frequent patterns have been removed according to the first embodiment, illustrating a basis matrix obtained as a result of performing the second pattern extraction by using the log matrices obtained as FIG. 9 and FIG. 10 from which the patterns have been removed from the log matrix in FIG. 7. As compared to the pattern in FIG. 9 in the first pattern extraction, IDs 200 to 500 that have not appeared in the first pattern extraction appear in the pattern of the basis number 8. These IDs are an ID group that has appeared only during the system failure on the second day.

Figure 14:
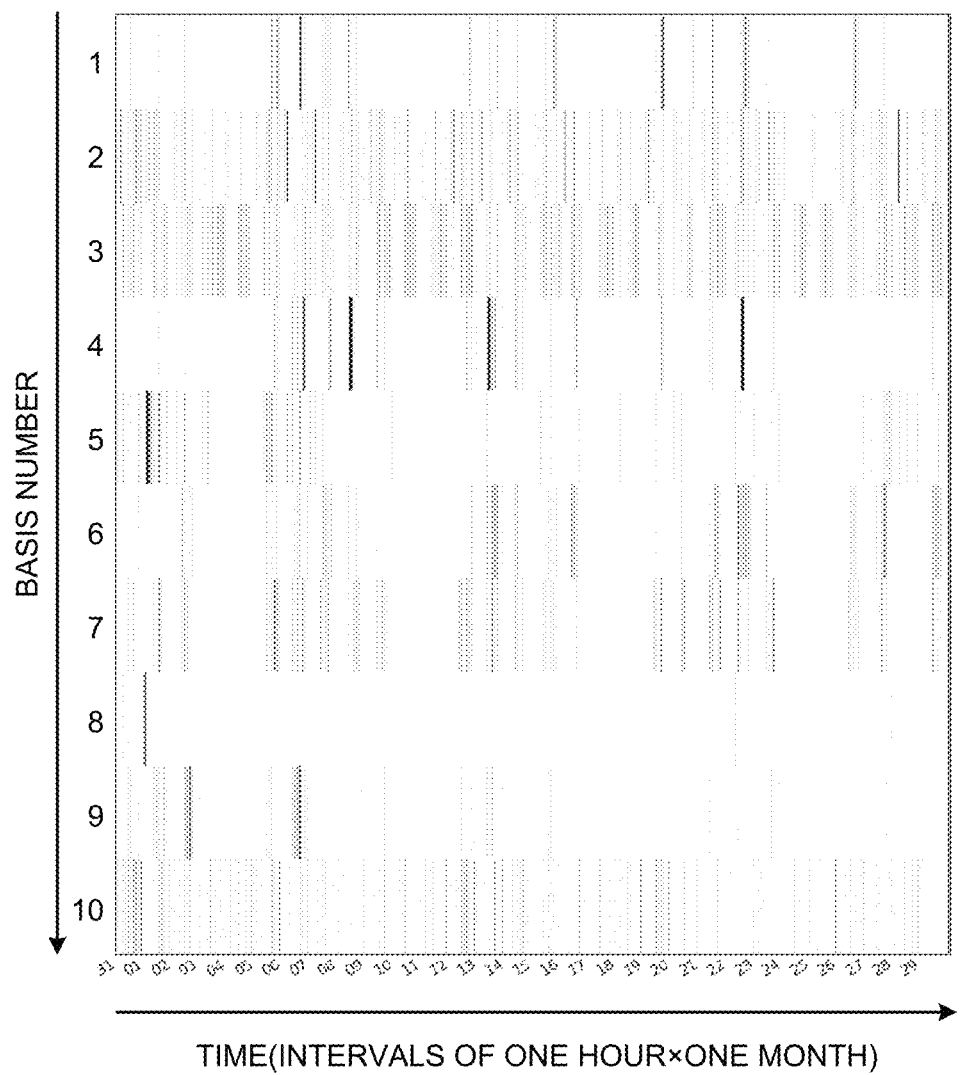
FIG. 14 is a diagram illustrating an example of an image visualizing a weighting matrix from which frequent patterns have been removed according to the first embodiment.

The output unit 13 can output an image visualizing the weighting matrix U' as illustrated in FIG. 14. FIG. 14 is a diagram illustrating an example of an image visualizing a weighting matrix from which frequent patterns have been removed according to the first embodiment, illustrating a weighting matrix obtained as a result of performing the second pattern extraction by using the log matrices obtained as FIG. 9 and FIG. 10 from which the patterns have been removed from the log matrix in FIG. 7. As illustrated in FIG. 14, the pattern of the basis number 8 including the ID group upon the failure in FIG. 13 appears on the second day. The pattern of the basis number 5 strongly appears mainly on the second day, and can be said to be a pattern possibly relating to the failure.

While the case where a significant basis matrix or a significant weighting matrix is used to remove frequent patterns has been described, the removal unit 154 may remove frequent patterns by using a non-significant basis matrix or a non-significant weighting matrix. Specifically, the removal unit 154 uses any one of the product of a basis matrix and a non-significant weighting matrix obtained by replacing the values of elements in each pattern in a weighting matrix equal to or larger than a predetermined threshold with 0, the product of a non-significant basis matrix obtained by replacing the values of elements in each pattern in a basis matrix equal to or larger than a predetermined threshold with 0 and a weighting matrix, and the product of the non-significant basis matrix and the non-significant weighting matrix as a matrix obtained by removing patterns from a log matrix. Note that, when an element in the log matrix becomes minus after the calculation, the element can be replaced with 0 to be a non-negative value.

Specifically, the removal unit 154 removes frequent patterns from a log matrix by Equation (4). Similarly to Equation (3), Y is a log matrix, H is a basis matrix, U is a weighting matrix, and E is an error matrix. Y is decomposed into HU and E. $H_{rare}$ is a matrix obtained by replacing, for each column in H, the value in a row equal to or larger than a predetermined threshold with 0, that is, a non-significant basis matrix. $U_{rare}$ is a matrix obtained by replacing, for each row in U, the value in a column equal to or larger than a predetermined threshold with 0, that is, a non-significant weighting matrix. $Y'_{e2}$ is a log matrix from which the frequent patterns have been removed.

$$Y'_{e2} = H_{e2} U_{e2} \qquad (4)$$

where $$H_{e2} = \begin{Bmatrix} H \\ H_{rare} \end{Bmatrix}, U_{e2} = \begin{Bmatrix} U \\ U_{rare} \end{Bmatrix}$$

As expressed by Equation (4), $H_{e2}$ is H or $H_{rare}$. $U_{e2}$ is U or $U_{rare}$. When $H_{e2}$ is H, $U_{e2}$ is $U_{rare}$ and when $U_{e2}$ is U, $H_{e2}$ is $H_{rare}$. In other words, $H_{e2}U_{e2}$ in Equation (4) includes at least one of the non-significant basis matrix and the non-significant weighting matrix. In this manner, $H_{e2}U_{e2}$ in Equation (4) is expressed by any one of $H_{rare}U$, $HU_{rare}$, and $H_{rare}U_{rare}$.

The removal unit 154 may further remove frequent patterns from the log matrix Y'. In this case, the pattern extraction unit 153 further extracts frequent patterns from the log matrix from which the frequent patterns have been removed by the removal unit 154. The pattern extraction unit 153 and the removal unit 154 may repeat the extraction of frequent patterns and the removal of frequent patterns until a predetermined condition is satisfied.

The determination unit 155 calculates the degree of importance for each of elements included in the frequent pattern extracted from the log matrix by the pattern extraction unit 153, and determines whether the degree of importance is equal to or higher than a predetermined threshold. The determination unit 155 may further calculate the degree of importance for each of elements included in the frequent pattern further extracted by the pattern extraction unit 153 from the log matrix from which the frequent pattern has been removed by the removal unit 154, and determine whether the degree of importance is equal to or higher than a predetermined threshold. Now, an example of the case where the determination unit 155 calculates the degree of importance for each ID of elements included in a frequent pattern is described.

To extract IDs characterizing each column in a basis matrix, IDs corresponding to elements having large values can be preferentially extracted. However, IDs included in a plurality of columns may be improper as IDs characterizing each column. For example, there is an ID continuing to constantly appear frequently before or after a frequent pattern is removed, the ID may be included in a plurality of columns in a basis matrix. This is easily confirmed from FIG. 9. Even if such an ID is extracted, it is difficult to utilize the ID for anomaly detection.

In view of the above, the determination unit 155 calculates, for each ID included in a frequent pattern, the degree of importance so as to be higher as the value of an element for each ID in the pattern becomes higher and be lower as the number of frequent patterns including the ID becomes larger, and determines whether the degree of importance is equal to or higher than a predetermined threshold. Examples of the determination method based on such a degree of importance include TF-IDF (Reference document 2: "tf-idf", [online], Wikipedia, [searched on Jan. 26, 2017], Internet <URL: https://ja.wikipedia.org/wiki/Tf-idf>). The determination unit 155 can calculate the degree of importance by the method based on TF-IDF. For example, when the basis matrix H is a matrix D, the determination unit 155 uses Equations (5-1) to (5-3) to calculate the degree of importance tfidf(t,d,D) of an ID of t in a column d in the matrix D.

$$tf(t, d) = f_{t,d} \quad (5\text{-}1)$$

$$idf = \log \frac{N}{n_t} \quad (5\text{-}2)$$

$$tfidf(t, d, D) = tf(t, d) \cdot idf(t, D) \quad (5\text{-}3)$$

$f_{t,d}$ is the value of an element with the ID of t in the column d. N is the number of bases, that is, the number of columns in the basis matrix H. $n_t$ is the number of columns in the basis matrix H in each of which the value of an element of an ID is equal to or larger than a predetermined threshold.

The determination unit 155 may calculate the degree of importance only for a particular ID. The determination unit 155 may calculate a first threshold for all element values in each column vector in the basis matrix H by using Otsu's method (Reference document 3: Nobuyuki Otsu: "A threshold selection method from gray-level histograms," Automatica 11.285-296 (1975), pp. 23-27), and calculate the degree of importance only for an ID having the value of the element equal to or larger than the first threshold.

The determination unit 155 may calculate a second threshold for all element values in each row vector by using Otsu's method based on the frequency of appearance of each pattern for each predetermined duration, that is, a weighting matrix, and determine whether the frequency of appearance for each predetermined duration is equal to or larger than the second threshold.

The determination unit 155 may calculate the degree of importance for a time. Specifically, when the weighting matrix U is a matrix D, the determination unit 155 uses Equations (5-1) to (5-3) to calculate the degree of importance tfidf(t,d,D) of a time of t in a row d in the matrix D.

$f_{t,d}$ is the value of an element with the time of t in the row d. N is the number of bases, that is, the number of rows in the weighting matrix H. $n_t$ is the number of rows in the weighting matrix U in each of which the value of an element of a time is equal to or larger than a predetermined threshold.

The determination unit 155 may calculate the degree of importance only for a particular time. The determination unit 155 may calculate a third threshold for all elements in each row vector in the weighting matrix U by using Otsu's method, and calculate the degree of importance only for a time having the value of the element equal to or larger than the third threshold.

Figure 15:
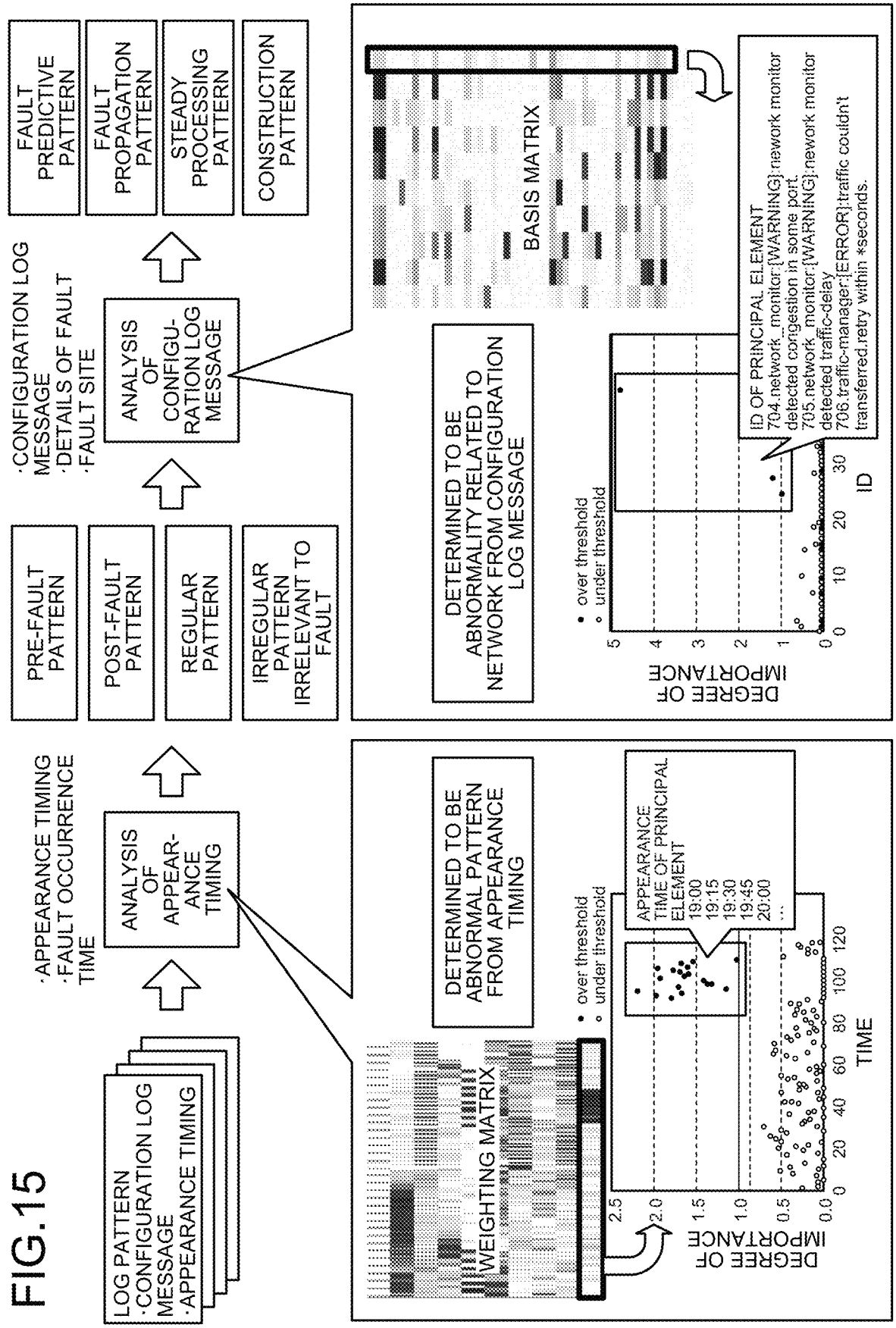
FIG. 15 is a diagram for describing profiling of text logs according to the first embodiment.

The above-mentioned calculation of the degree of importance or determination using the threshold enables profiling as illustrated in FIG. 15 to be performed. FIG. 15 is a diagram for describing the profiling of a text log according to the first embodiment.

For example, by performing the determination using the second threshold for a weighting matrix, extracting a duration equal to or larger than the second threshold as a principal element, and collating the duration with external information such as a failure occurrence time, the type of a pattern can be estimated. In this manner, patterns can be classified into a pre-fault pattern, a post-fault pattern, a regular pattern, and an irregular pattern irrelevant to a failure.

By extracting an ID whose degree of importance is equal to or higher than a predetermined value from a basis matrix and collating each message of the ID having the principal element (that is, template in dictionary information 142) with external information such as failure details and a failure site, whether the pattern is relevant to a failure can be estimated. For example, it can be determined whether a pattern that has been classified as a pre-fault pattern from the weighting matrix is a fault predictive pattern indicating a sign of a fault, whether a pattern that has been classified as a post-fault pattern is a fault propagation pattern indicating the influence of a fault, whether a pattern that has been classified as a regular pattern is a steady processing pattern indicating normal processing, and a pattern that has been classified as an irregular pattern irrelevant to a fault is a construction pattern indicating that a construction was performed.

The significant log extraction unit 156 and the sequence extraction unit 157 extract predetermined information on principal elements from the classified text log 52. Note that the significant log extraction unit 156 and the sequence extraction unit 157 are an example of an information extraction unit.

The significant log extraction unit 156 generates a significant log by extracting, from the classified text log 52, a record including only IDs that are principal elements of a basis matrix extracted by the determination unit 155. The significant log extraction unit 156 may generate a significant log by limiting to, in addition to the ID as a principal element, a time corresponding to a duration as a principal element in the weighting matrix extracted by the determination unit 155. The significant log extraction unit 156 may generate a significant log for each pattern. The significant log extraction unit 156 may generate a significant log by converting the date of occurrence into another time format such as UNIX (registered trademark) time.

The sequence extraction unit 157 extracts, from the significant log generated by the significant log extraction unit 156, a particular sequence among sequences indicating the order of appearance of IDs.

Specifically, the sequence extraction unit 157 counts the number of appearances of each sequence of IDs included in the significant log, and extracts a sequence having a large number of appearances. The extraction of sequences can be determined by using any method such as the extraction of a sequence having the largest number of appearances, the extraction of the top k sequences having a larger number of appearances, and the extraction of sequences whose number of appearances is equal to or larger than a designated number.

The sequence extraction unit 157 may extract only a sequence that has been determined to satisfy a predetermined condition among sequences having a large number of appearances. Examples of the predetermined condition include, but not limited to, the length of the sequence and the sequence lapse time indicating the lapse time from the first ID to the last ID of the sequence. Regarding these conditions, the range of extraction may be limited by determining a threshold similarly to the number of appearances.

For example, when the sequence extraction unit 157 extracts "704", "705", and "706" as IDs whose degrees of importance calculated by the determination unit 155 are equal to or larger than a predetermined value, the significant log extraction unit 156 extracts a record including the IDs of "704", "705", and "706" from the classified text log 52 to generate a significant log. The sequence extraction unit 157 further extracts a sequence having a large number of appearances from the significant log.

The sequence extraction unit 157 can use algorithms of sequential pattern mining (Reference document 4: J. Pei et al. "PrefixSpan: Mining Sequential Patterns Efficiently by Prefix-Projected Pattern Growth," Proc. of The 17th Int'l Conf. on Data Engineering, pp. 215-224 (2001) http://idb.csie.ncku.edu.tw/tsengsm/COURSE/DM/Paper/PrefixSpan.pdf) and episode mining (Reference document 5: A. Achar et al. "Pattern-growth based frequent serial episode discovery," Data and Knowledge Engineering, 87:pp. 91-108 (2013)) as the method for extracting sequences.

Figure 16:
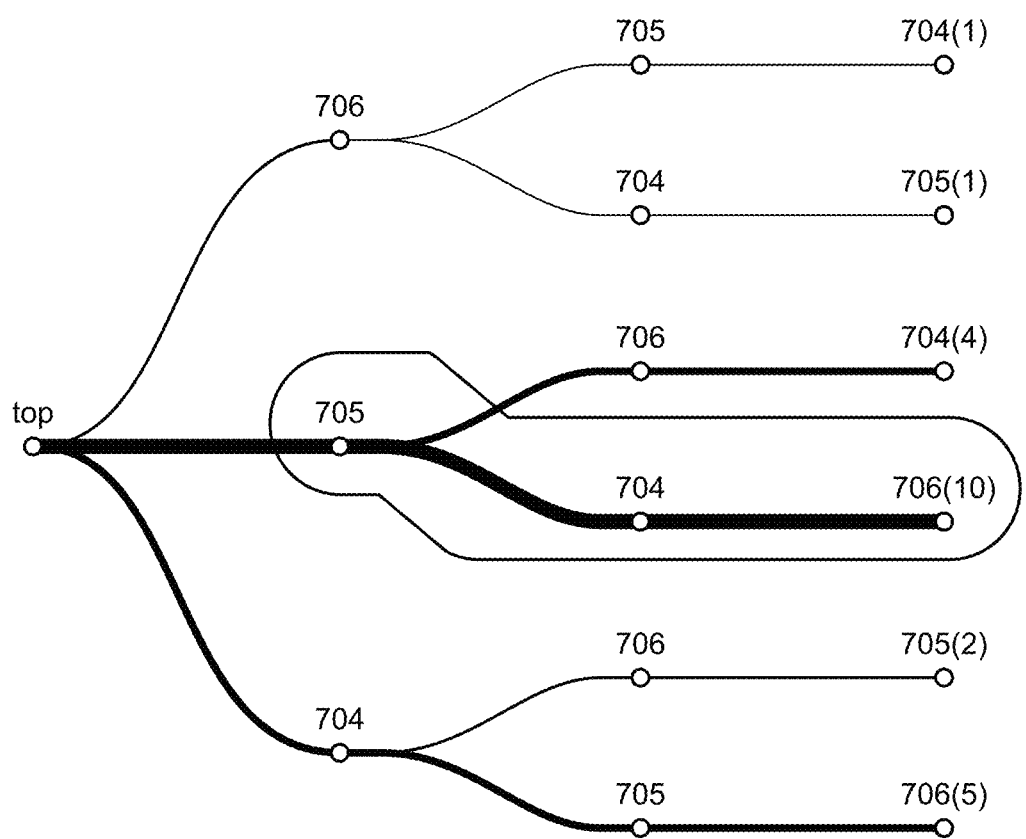
FIG. 16 is a diagram for describing extraction of sequences according to the first embodiment.

FIG. 16 is a diagram for describing the extraction of sequences according to the first embodiment. This example is a sequence extraction example based on a combination of IDs without repetition. As illustrated in FIG. 16, the number of combinations of sequences of messages with the IDs of "704", "705", and "706" is 3!, that is, 6. The sequence extraction unit 157 counts the number of appearances of each of the sequences. For extracting a sequence having the largest number of appearances, the sequence extraction unit 157 extracts a sequence "705-704-706" having the number of appearances of 10. A user can estimate the cause of a failure based on the sequence extracted by the sequence extraction unit 157.

Processing in First Embodiment

Figure 17:
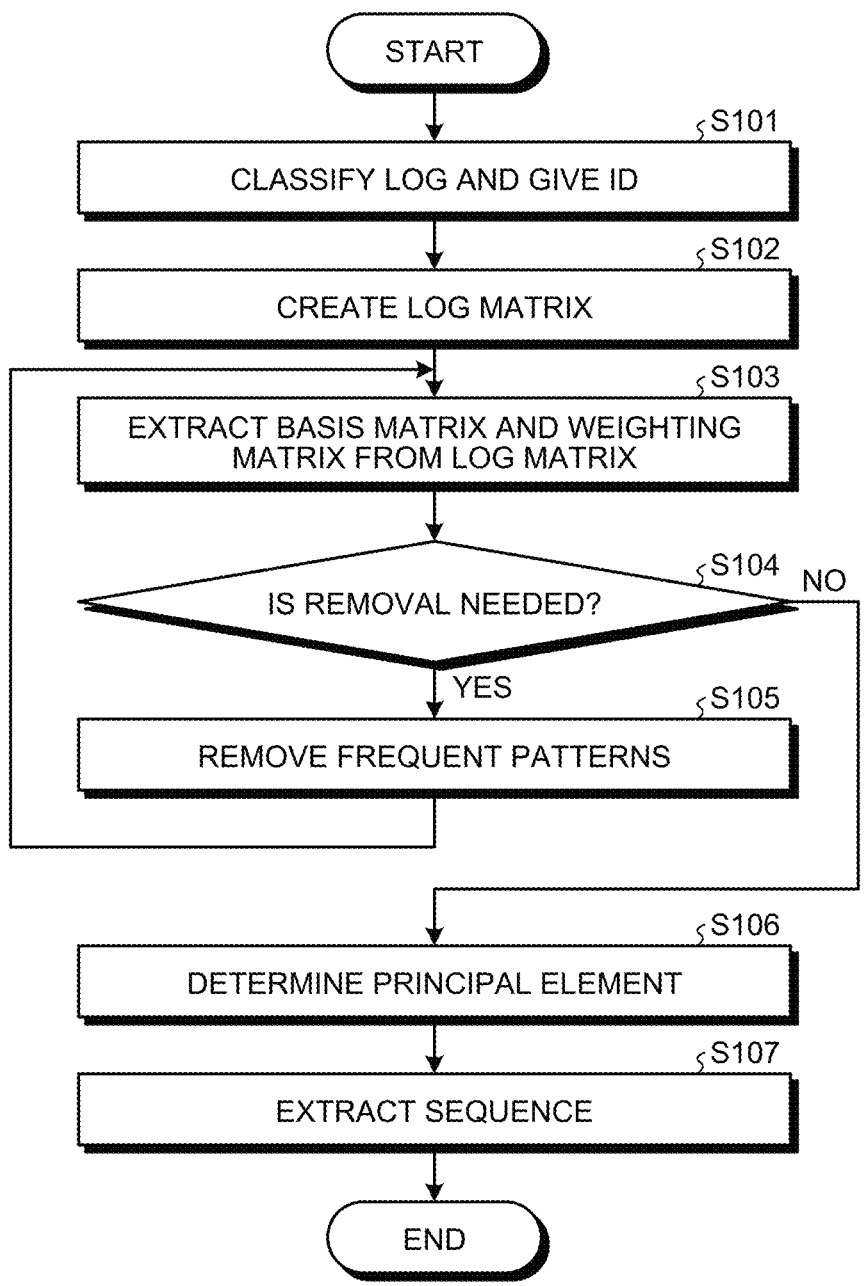
FIG. 17 is a flowchart illustrating the flow of processing by the analysis device according to the embodiment.

Referring to FIG. 17, the flow of processing by the analysis device 10 is described. FIG. 17 is a flowchart illustrating the flow of processing by the analysis device according to the embodiment. As illustrated in FIG. 17, first, the classification unit 151 classifies messages of a text log for each type, and gives IDs (Step S101). The creation unit 152 creates a log matrix based on the dates of occurrence in the text log and the IDs given by the classification unit 151 (Step S102).

Next, the pattern extraction unit 153 decomposes the log matrix to extract a basis matrix and a weighting matrix (Step S103). For example, the pattern extraction unit 153 decomposes the log matrix by NMF to extract a basis matrix in which a pattern as a combination of IDs is a column vector and a weighting matrix in which a column vector indicates how frequently the pattern has appeared for each predetermined duration.

When it is determined that a predetermined condition is satisfied and a pattern needs to be removed (Yes at Step S104), the removal unit 154 removes a frequent pattern from the log matrix (Step S105). For example, the removal unit 154 removes a frequent pattern by subtracting, from the log matrix, the product of the basis matrix and a significant weighting matrix obtained by replacing the value of each element in the weighting matrix smaller than a predetermined threshold with 0. Alternatively, the removal unit 154 removes a frequent pattern by taking the product of the basis matrix and a non-significant weighting matrix obtained by replacing the value of each element in the weighting matrix equal to or larger than a predetermined value with 0. The pattern extraction unit 153 further extracts a pattern (Step S103).

When it is not determined that a predetermined condition is satisfied and a frequent pattern needs to be removed (No at Step S104), the determination unit 155 determines a principal element in the basis matrix or the weighting matrix or both the matrices (Step S106). For example, the determination unit 155 calculates, for each ID included in the pattern, the degree of importance so as to be higher as the value of the element of the ID becomes higher and be lower as the number of frequent patterns including the ID becomes larger, determines whether the degree of importance is equal to or higher than a predetermined threshold, and extracts a principal element in the basis matrix. The determination unit 155 calculates a second threshold for each duration included in the pattern by using Otsu's method, determines whether the value of the element for each predetermined duration is equal to or larger than the second threshold, and extracts a principal element in the weighting matrix.

The significant log extraction unit 156 generates a significant log by extracting, from the classified text log 52, a record including only IDs of principal elements in the basis matrix extracted by the determination unit 155.

The sequence extraction unit 157 extracts a sequence from the significant log generated by the significant log extraction unit 156 (Step S107). For example, the sequence extraction unit 157 extracts, for a combination of IDs included in the pattern, a sequence the value of the element of which, that is, the number of appearances of which, is equal to or larger than a predetermined threshold and which satisfies a predetermined condition among sequences of the IDs.

Effects in First Embodiment

The classification unit 151 classifies messages included in a text log output from a system for each type, and gives an ID set for each type to each of the classified messages. Based on the dates of occurrence attached to messages, the creation unit 152 creates a matrix indicating the appearance distribution of the messages in the text log for each predetermined duration for each ID. The pattern extraction unit 153 extracts a plurality of patterns as combinations of IDs from the matrix created by the creation unit 152. The removal unit 154 removes a part or whole of the patterns from the matrix. The determination unit 155 calculates the degree of importance for each element included in each of the patterns, and determines whether the degree of importance is equal to or higher than a predetermined threshold. The significant log extraction unit 156 and the sequence extraction unit 157 extract predetermined information on principal elements from the classified text log 52.

The analysis device 10 in the first embodiment creates a matrix based on the appearance distribution of a plurality of messages, and can thus extract patterns based on the messages to perform monitoring taking the relation among the messages into consideration. Consequently, for example, a series of predictive patterns and propagation patterns upon the occurrence of a fault can be monitored and utilized for preventive maintenance and cause estimation of faults. By performing the monitoring taking the relation among messages into consideration, the occurrence of a wolf alert, that is, an alert based on erroneous detection that anomaly has occurred through no anomaly has actually occurred, can be suppressed.

The analysis device 10 in the first embodiment creates a matrix from the entire collected text log, and hence information on the entire text log can be reflected to a matrix, and, for example, useful information can be obtained from text logs that have been otherwise overlooked by simple monitoring of individual messages.

By classifying a text log to form a matrix before calculation, a massive amount of text logs can be efficiently analyzed. By removing frequent patterns, a pattern that cannot be extracted as a frequent pattern due to the presence of a pattern related to regular processing and a pattern included in an error can now be extracted, and useful information for anomaly detection can be obtained. By determining whether an element included in a frequent pattern is a principal element, an important message can be extracted from a text log. By extracting information related to the extracted important message, the calculation amount and processing time required for analysis of messages can be reduced.

For example, the determination unit 155 can calculate the degree of importance for each ID included in each of a plurality of patterns, and determine whether the degree of importance is equal to or higher than a predetermined threshold. In this case, the sequence extraction unit 157 extracts a particular sequence from sequences indicating the order of appearance of IDs that have been determined by the determination unit 155 to have degrees of importance equal to or higher than a predetermined threshold. By extracting a sequence of principal messages in this manner, the calculation amount and processing time for extracting a sequence can be reduced to facilitate analysis based on the sequence of messages.

The classification unit 151 classifies messages included in a text log output from a system for each type, and gives an ID set for each type to each of the classified messages. Based on the dates of occurrence attached to messages, the creation unit 152 creates a log matrix that is a matrix indicating the appearance distribution of the messages in the text log for each ID for each predetermined duration. The pattern extraction unit 153 decomposes the log matrix to extract a basis matrix whose column vectors are patterns as combinations of IDs and a weighting matrix whose row vectors indicate how frequently the pattern appears for each predetermined duration. The removal unit 154 removes a part or whole of the patterns from the log matrix.

The analysis device 10 in the first embodiment extracts a plurality of relevant messages as patterns, and hence an event occurring in the system can be easily specified. By removing patterns, a pattern indicating a less frequent event such as a system fault can be extracted and utilized for monitoring. For example, an extracted fault predictive pattern can be monitored and utilized for preventive maintenance of faults, and a propagation pattern upon the occurrence of a fault can be specified and utilized for cause estimation. By performing the monitoring taking the relation among messages into consideration, the occurrence of a wolf alert, that is, an alert based on erroneous detection that anomaly has occurred through no anomaly has actually occurred, can be suppressed.

The analysis device 10 in the first embodiment classifies a text log, and can thus compress several thousands to several hundred millions of message to types on the order of several hundreds to several thousands, which can be grasped by humans. A matrix is created from the entire collected text logs, and hence information on a massive amount of logs can be reflected to one matrix, and, for example, useful information can be obtained from text logs that have been otherwise overlooked by simple monitoring of individual messages and been archived and not been utilized.

The pattern extraction unit 153 may decompose a log matrix by non-negative matrix factorization. In this manner, by classifying a text log to form a matrix before calculation, a massive amount of text logs can be efficiently analyzed. By removing patterns, patterns having a low frequency of appearance, that is, a pattern that has not been extracted due to the presence of a pattern related to regular processing and a pattern included in an error upon the first pattern extraction can now be extracted, and hence useful information for anomaly detection can be obtained.

The removal unit 154 can remove a pattern by subtracting, from a log matrix, any one of the product of a basis matrix and a significant weighting matrix obtained by replacing the values of elements smaller than a predetermined threshold in each pattern in a weighting matrix with 0, the product of a significant basis matrix obtained by replacing the values of elements smaller than a predetermined threshold in each pattern in a basis matrix with 0 and a weighting matrix, and the product of the significant basis matrix and the significant weighting matrix. The removal unit 154 can use any one of the product of a basis matrix and a non-significant weighting matrix obtained by replacing the values of elements equal to or larger than a predetermined threshold in each pattern in a weighting matrix with 0, the product of a non-significant basis matrix obtained by replacing the values of elements equal to or larger than a predetermined threshold in each pattern in a basis matrix with 0 and a weighting matrix, and the product of the non-significant basis matrix and the non-significant weighting matrix as a matrix obtained by removing patterns from the log matrix. In this manner, the influence of patterns related to regular processing that has a certain level or more can be removed.

The pattern extraction unit 153 may further extract frequent patterns from a matrix from which frequent patterns have been removed by the removal unit 154. In this manner, even when the influence of a pattern related to regular processing has not been removed in the removal of frequent patterns once, the influence of the pattern related to regular processing can be further removed to extract a less frequent pattern.

The classification unit 151 classifies messages included in a text log output from a system for each type, and gives an ID set for each type to each of the classified messages. Based on the dates of occurrence attached to messages, the creation unit 152 creates a matrix indicating the frequency of appearance of the messages in the text log for each ID for each predetermined duration. The pattern extraction unit 153 extracts a combination of IDs whose frequencies of appearance of messages in the same duration are equal to or higher than a predetermined value from the matrix created by the creation unit 152 as a frequent pattern. The removal unit 154 removes the frequent pattern from the matrix. The determination unit 155 determines, for each ID included in another frequent pattern extracted by the pattern extraction unit 153 from the matrix from which the frequent pattern has been removed by the removal unit 154, whether the frequency of appearance in a text log of a corresponding message satisfies a predetermined condition. The sequence extraction unit 157 extracts a particular sequence from sequences of IDs whose frequencies of appearance in the text log have been determined by the determination unit 155 to satisfy the predetermined condition.

The analysis device 10 in the first embodiment creates a matrix based on the frequencies of appearance of a plurality of messages, and can thus extract a pattern based on the messages to perform monitoring taking the relation among the messages into consideration. Consequently, for example, a series of predictive patterns and propagation patterns upon the occurrence of a fault can be monitored and utilized for preventive maintenance and cause estimation of faults. By performing the monitoring taking the relation among messages into consideration, the occurrence of a wolf alert, that is, an alert based on erroneous detection that anomaly has occurred through no anomaly has actually occurred, can be suppressed.

By determining whether an element included in a frequent pattern extracted from a text log in the form of a matrix is a principal element, an important message can be extracted from the text log.

The determination unit 155 may calculate a first threshold by using Otsu's method based on the frequency of appearance of a message for each ID, and calculate the degree of importance for an ID whose frequency of appearance of the message is equal to or larger than a first threshold. In this manner, load for calculating the degree of importance can be reduced.

The pattern extraction unit 153 may further extract the frequencies of appearance of messages related to a combination for each predetermined duration. In this case, the determination unit 155 may calculate a second threshold by using Otsu's method based on the frequencies of appearance of messages related to a combination for each predetermined duration, and determine whether, for each predetermined duration, the frequency of appearance of the message is equal to or higher than a second threshold. In this manner, not only analysis based on the contents of a message but also analysis based on the date of occurrence of a message can be performed.

By classifying a text log to form a matrix before calculation, a massive amount of text logs can be efficiently analyzed. By removing frequent patterns, a pattern that cannot be extracted as a frequent pattern due to the presence of a pattern related to regular processing and a pattern included in an error can now be extracted, and useful information for anomaly detection can be obtained. By determining whether an element included in a frequent pattern is a principal element, an important message can be extracted from a text log. By extracting a sequence of principal messages, the calculation amount and processing time for extracting a sequence can be reduced to facilitate analysis based on a sequence of messages.

The classification unit 151 classifies messages included in a text log output from a system for each type, and gives an ID set for each type to each of the classified messages. Based on the dates of occurrence attached to messages, the creation unit 152 creates a matrix indicating the appearance distribution of the messages in the text log for each ID for each predetermined duration. The pattern extraction unit 153 extracts a plurality of patterns, which are combinations of IDs, from the matrix created by the creation unit 152. The determination unit 155 calculates the degree of importance for each ID included in each of the patterns, and determines whether the degree of importance is equal to or higher than a predetermined threshold. The significant log extraction unit 156 generates a significant log by extracting, from a log obtained by replacing each message in the text log with an ID given by the classification unit 151, only an ID determined by the determination unit to be equal to or larger than a predetermined threshold. The sequence extraction unit 157 counts, from the generated significant log, the number of appearances of each sequence indicating the order of appearance of IDs having a high degree of importance, and extracts a sequence the number of appearances of which is equal to or larger than a predetermined threshold and which satisfies a predetermined condition.

The analysis device 10 in the present embodiment creates a matrix based on the frequencies of appearance of a plurality of messages, and can thus extract a pattern based on the messages, and perform the monitoring taking the relation among messages into consideration. Consequently, for example, a series of predictive patterns and propagation patterns upon the occurrence of a fault can be monitored and utilized for preventive maintenance and cause estimation of faults. By performing the monitoring taking the relation among messages into consideration, the occurrence of a wolf alert, that is, an alert based on erroneous detection that anomaly has occurred through no anomaly has actually occurred, can be suppressed.

By extracting a sequence of principal messages included in a pattern extracted from a text log in the form of a matrix, the calculation amount and processing time for extracting a sequence can be reduced to facilitate analysis of messages based on the sequence.

The pattern extraction unit 153 may further extract the degree of appearance of a pattern for each predetermined duration. In this case, the determination unit 155 calculates a second degree of importance of a pattern for each predetermined duration, and further determines whether the second degree of importance is equal to or higher than a predetermined second threshold. The significant log extraction unit 156 generates a significant log by extracting only a predetermined duration determined by the determination unit 155 to be equal to or larger than the predetermined second threshold.

In this manner, IDs related to events in the system have been specified for each event to some degree at the time of the pattern extraction, and hence by generating a significant log for each pattern and extracting a sequence therefrom, an event in the system can be easily interpreted from the extracted sequence.

Second Embodiment

The method of matrix decomposition in the present invention is not limited to NMF described in the first embodiment. In the present invention, as the method of matrix decomposition, for example, methods for a matrix including values other than non-negative values such as principal component analysis and independent component analysis may be used. As a second embodiment, the case where matrix decomposition is performed by using a method other than NMF is described.

In the second embodiment, the removal unit 154 uses a method such as principal component analysis or independent component analysis to decompose a log matrix into a basis matrix and a weighting matrix. In the second embodiment, the method for creating a significant basis matrix, a significant weighting matrix, a non-significant basis matrix, and a non-significant weighting matrix is different from that in the first embodiment. In the first embodiment, the removal unit 154 uses a significant basis matrix obtained by replacing the values of elements in the basis matrix smaller than a predetermined threshold with 0, and uses a significant weighting matrix obtained by replacing the values of elements in the weighting matrix smaller than a predetermined threshold with 0.

In the second embodiment, on the other hand, the removal unit 154 determines whether the absolute value of a value of an element is larger than a threshold to determine whether to replace the value of the element with 0. Specifically, the removal unit 154 uses a significant basis matrix obtained by replacing the values of elements in the basis matrix whose absolute values are smaller than a predetermined threshold with 0, and uses a significant weighting matrix obtained by replacing the values of elements in the weighting matrix whose absolute values are smaller than a predetermined threshold with 0.

In the second embodiment, the removal unit 154 may determine whether to replace the value of an element with 0 by using a positive threshold when the value of the element is positive and by using a negative threshold when the value of the element is negative. Specifically, the removal unit 154 can use a significant basis matrix obtained by replacing the values of elements in the basis matrix which are positive and smaller than a positive threshold and the values of elements in the basis matrix which are negative and larger than a negative threshold with 0, and use a significant weighting matrix obtained by replacing the values of elements in the weighting matrix which are positive and smaller than a positive threshold and the values of elements in the weighting matrix which are negative and larger than a negative threshold with 0.

In the second embodiment, when creating a significant basis matrix and a significant weighting matrix, the removal unit 154 replaces the values of elements that cannot be replaced with 0 with 0 to create a non-significant basis matrix and a non-significant weighting matrix. Specifically, the removal unit 154 can use a non-significant basis matrix obtained by replacing the values of elements in a basis matrix whose absolute values are equal to or larger than a predetermined threshold with 0, and use a non-significant weighting matrix obtained by replacing the values of elements in a weighting matrix whose absolute values are equal to or larger than a predetermined threshold with 0.

The removal unit 154 can use a non-significant basis matrix obtained by replacing the values of elements in a basis matrix which are positive and equal to or larger than a positive threshold and which are negative and equal to or smaller than a negative threshold with 0, and use a non-significant weighting matrix obtained by replacing the values of elements in a weighting matrix which are positive and equal to or larger than a positive threshold and which are negative and equal to or larger than a negative threshold with 0.

Third Embodiment

The analysis device of the present invention can decompose an input matrix having item indices as items in each row and having instance indices as items in each column into the product of two matrices. In this case, the input matrix is not limited to a log matrix created based on messages included in a text log output from a system.

For example, the input matrix may be a purchase log matrix indicating the quantity of products that have been purchased by each customer for each product based on a purchase log having purchase information indicating which product has been purchased by each customer. In this case, item indices in the input matrix are IDs that can identify products. Instance indices in the input matrix are IDs that can identify customers. The value of an element in the input matrix is purchase information on a product. Examples of the purchase information include, but not limited to, the quantity of purchase and the value processed by taking the logarithm of the quantity of purchase and the presence/absence of purchase (values of 1 for purchase and 0 for non-purchase). In the following embodiment, an example in which the quantity of purchase is used as purchase information is described.

In a third embodiment, the pattern extraction unit 153 extracts a basis matrix whose column vectors are a plurality of patterns as a combination of item indices and a weighting matrix whose row vectors are each a weight in the instance indices in each pattern. The determination unit 155 calculates the degree of importance for each item index included in a plurality of patterns, and determines whether the degree of importance is equal to or higher than a predetermined threshold.

Processing in Third Embodiment

Referring to FIG. 17, the flow of processing by the analysis device according to the third embodiment is described. FIG. 17 has been referred to for the description of the flow of the processing by the analysis device in the first embodiment. The analysis device in the third embodiment performs processing with the same flow as that of the analysis device in the first embodiment, and hence FIG. 17 is also referred to for the following description.

First, the classification unit 151 classifies, for each product, purchase logs having information indicating which product has been purchased by each customer, and gives a product ID (Step S101). Based on information on customers in the purchase logs and customer IDs given by the classification unit 151, the creation unit 152 creates a purchase log matrix indicating the quantity of purchase of each product by each customer, that is, an input matrix (Step S102).

In the third embodiment, the analysis device 10 may or may not create a log matrix indicated by Steps S101 and S102. In the case where the analysis device 10 does not create a log matrix, an input matrix may be input from the outside. In the following description, item indices as items in each row of the purchase log matrix are product IDs, and instance indices as items in each column are customer IDs.

Next, the pattern extraction unit 153 decomposes the purchase log matrix to extract a basis matrix and a weighting matrix (Step S103). For example, the pattern extraction unit 153 decomposes the purchase log matrix by NMF, and extracts, as a pattern, a basis matrix indicating a pattern as a combination of IDs of products that are purchased by many customers and a weighting matrix indicating a combination of IDs of customers who purchase the products corresponding to the pattern.

In the third embodiment, the analysis device 10 may or may not remove a frequent pattern indicated by Steps S104 and S105. In the case where a frequent pattern is not removed, the analysis device 10 executes Step S103 and then executes Step S106 without executing Step S105 (No at Step S104).

Next, the determination unit 155 determines whether each element in the basis matrix is a principal element (Step S106). In this case, the determination unit 155 calculates the degree of importance for each of product IDs included in each of a plurality of patterns, and determines whether the degree of importance is equal to or higher than a predetermined threshold. In the third embodiment, the analysis device 10 may or may not extract a sequence indicated by Step S107.

For calculating the degree of importance and determining principal elements, the determination unit 155 can appropriately use the method for calculating the degree of importance based on TF-IDF and the method for calculating the threshold by Otsu's method independently or in combination similarly to the first embodiment.

For example, the determination unit 155 can use the value of an element for each product ID included in a pattern as the degree of importance, and use, as a threshold, a threshold calculated by using Otsu's method based on the value of the element for each product ID included in the pattern.

The determination unit 155 can calculate, for each product included in the pattern, the degree of importance so as to be higher as the value of the element for each product becomes higher and be lower as the number of patterns including the product becomes larger.

The determination unit 155 can calculate a first threshold by using Otsu's method for the value of an element for each product ID in each pattern, that is, all elements in each column vector of the basis matrix, and calculate the degree of importance for a product ID whose value of the element is equal to or higher than the first threshold.

The pattern extraction unit 153 may further extract an ID of a customer who has purchased a product corresponding to the pattern. In this case, the determination unit 155 calculates a second degree of importance for each customer ID in each pattern, that is, all elements in a row vector of the weighting matrix, and further determines whether the second degree of importance is equal to or higher than the predetermined second threshold.

The determination unit 155 can use the value of an element for each customer ID in the pattern as the second degree of importance, and use, as the second threshold, a threshold calculated by using Otsu's method based on the value of the element for each customer ID included in the pattern.

The determination unit 155 calculates the second degree of importance so as to be higher as the value of the element for each predetermined customer ID in the pattern becomes higher and be lower as the number of patterns including the predetermined customer ID becomes larger.

The determination unit 155 calculates a third threshold by using Otsu's method based on the value of the element for each customer ID in each pattern, and calculates the second degree of importance for a customer ID whose value of the element is equal to or higher than a third threshold.

Effects in Third Embodiment

The pattern extraction unit 153 extracts a basis matrix whose column vectors are a plurality of patterns as a combination of item indices and a weighting matrix whose row vectors are each a weight of instance indices in each pattern. The determination unit 155 calculates the degree of importance for each item index included in each of the patterns, and determines whether the degree of importance is equal to or higher than a predetermined threshold. In this manner, the analysis device 10 in the third embodiment can efficiently extract an important item even when the size of an input matrix is very large.

In particular, when item indices of an input matrix are product IDs, instance indices are customer IDs, and the value of each element is the quantity of purchase, the analysis device 10 in the third embodiment can extract a pattern based on a plurality of products, and extract a group of products that are highly possibly purchased by the same customer. Thus, for example, it can be known that, of a product A and a product B that are more likely to be purchased by the same customer, a customer who has purchased only the product A will possibly purchase the product B as another product, and the product B can be recommended to the customer. Effects obtained when item indices of an input matrix are product IDs, instance indices are customer IDs, and the value of each element is the quantity of purchase are described below. According to the present invention, the same effects can be obtained for any input matrix having item indices as items in each row and instance indices as items in each column.

The determination unit 155 can use the value of an element for each product ID included in a pattern as the degree of importance, and use, as a threshold, a threshold calculated by using Otsu's method based on the value of the element for each product ID included in the pattern. In this manner, a product having a high degree of importance can be extracted.

The determination unit 155 calculates a second degree of importance so as to be higher as the value of an element for each predetermined customer ID in the pattern becomes higher and be lower as the number of patterns including the predetermined customer ID becomes larger. In this manner, a characteristic product can be extracted for each pattern.

The determination unit 155 can calculate a first threshold by using Otsu's method for the value of an element for each product ID in each pattern, that is, all elements in each column vector of the basis matrix, and calculate the degree of importance for a product ID whose value of the element is equal to or larger than the first threshold. In this manner, load for calculating the degree of importance can be reduced.

The pattern extraction unit 153 may further extract an ID of a customer who has purchased a product corresponding to the pattern. In this case, the determination unit 155 calculates a second degree of importance for each customer ID in each pattern, that is, all elements in a row vector of the weighting matrix, and further determines whether the second degree of importance is equal to or higher than a predetermined second threshold. In this manner, a customer having a high degree of importance can be extracted.

The determination unit 155 can use the value of an element for each customer ID in the pattern as the second degree of importance, and use, as the second threshold, a threshold calculated by using Otsu's method based on the value of the element for each customer ID included in the pattern. In this manner, load for calculating the degree of importance can be reduced.

The determination unit 155 calculates the second degree of importance so as to be higher as the value of the element for each predetermined customer ID in the pattern becomes higher and be lower as the number of patterns including the predetermined customer ID becomes larger. In this manner, a characteristic product can be extracted for each pattern.

The determination unit 155 calculates a third threshold by using Otsu's method based on the value of the element for each customer ID in each pattern, and calculates a second degree of importance for a customer ID whose value of the element is equal to or higher than the third threshold. In this manner, load for calculating the degree of importance can be reduced.

OTHER EMBODIMENTS

Dictionary information 142 created based on a text log 51 is not limited to the one illustrated in FIG. 3. For example, as illustrated in FIG. 18, a shorter character string may be used as a template. FIG. 18 is a diagram illustrating an example of a data configuration of dictionary information according to another embodiment. When a message that does not match any template is included in a text log to be analyzed, the analysis device 10 may add the message to the dictionary information 142 as necessary.

System Configurations, Etc.

The components of the illustrated devices are conceptually illustrative, and are not necessarily required to be physically configured as illustrated. In other words, a specific mode for dispersion and integration of the devices is not limited to the illustrated one, and all or part of the devices can be functionally or physically dispersed and integrated in any unit depending on various kinds of loads, usage conditions, and any other parameter. In addition, all or any part of the processing functions executed by the devices may be implemented by a CPU and computer programs analyzed and executed by the CPU, or implemented by hardware by wired logic.

Among the processing contents described in the above-mentioned embodiments, all or part of the processing that is described as being automatically executed can also be manually executed, or all or part of the processing that is described as being manually executed can also be automatically executed by a known method. In addition, the processing procedures, the control procedures, the specific names, and the information including various kinds of data and parameters described herein and illustrated in the accompanying drawings can be freely changed unless otherwise specified.

Computer Programs

In one embodiment, the analysis device 10 can be implemented by installing an analysis program for executing the above-mentioned analysis on a desired computer as package software or online software. For example, by causing an information processing device to execute the above-mentioned analysis program, the information processing device can be caused to function as the analysis device 10. The information processing device as used herein includes a desktop or notebook personal computer. In addition thereto, the category of the information processing device includes mobile communication terminals such as smartphones, mobile phones, and personal handyphone systems (PHS) and slate terminals such as personal digital assistant (PDA).

The analysis device 10 can be implemented as an analysis server device such that a terminal device used by a user is a client and service related to the above-mentioned analysis is provided to the client. For example, the analysis server device is implemented as a server device for providing analysis service by inputting text logs and outputting extracted IDs. In this case, the analysis server device may be implemented as a Web server, or may be implemented as a cloud for providing service related to the above-mentioned analysis by outsourcing.

Figure 19:
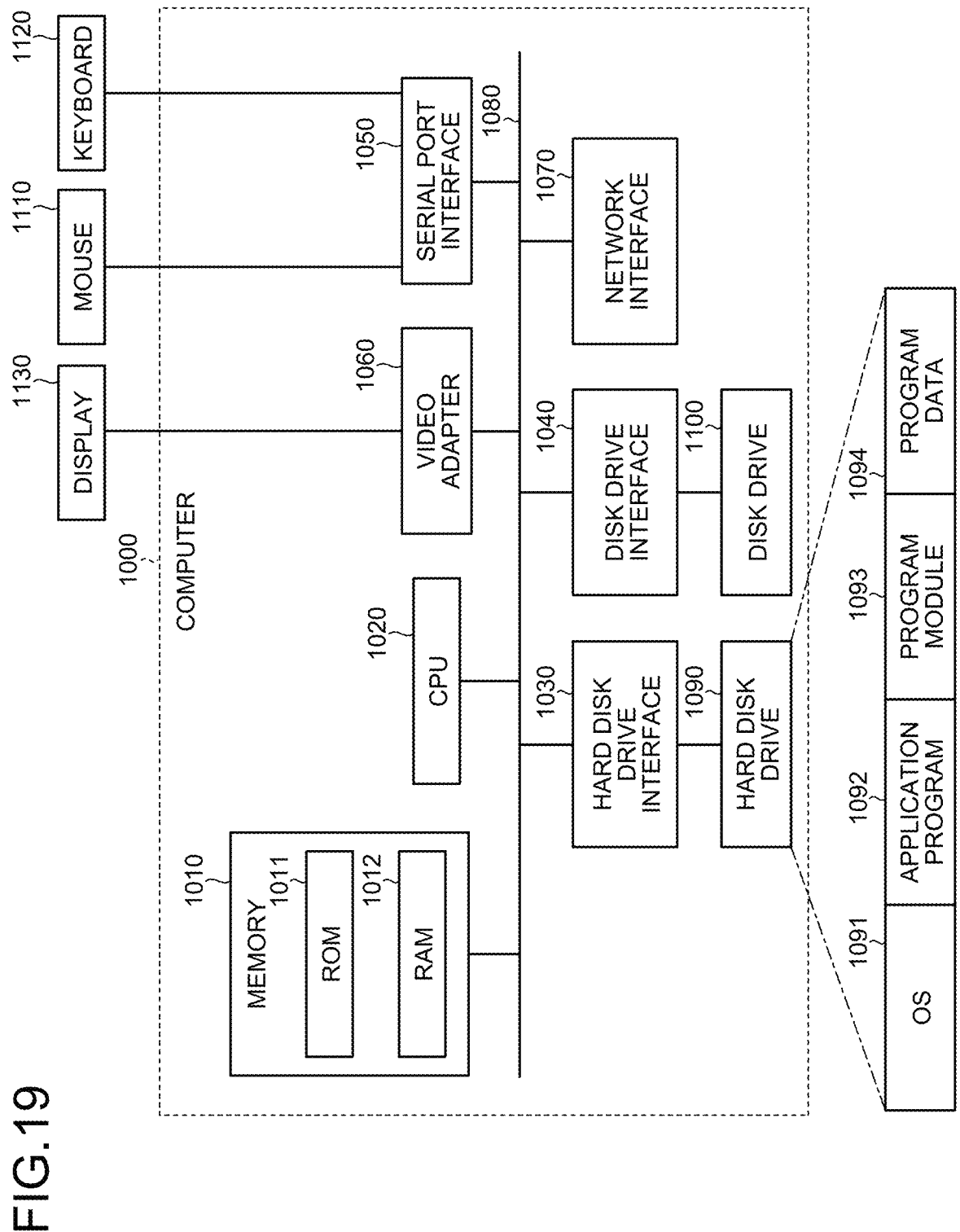
FIG. 19 is a diagram illustrating an example of a computer on which an analysis device is implemented by executing a computer program.

FIG. 19 is a diagram illustrating an example of a computer on which an analysis device is implemented when a computer program is executed. For example, a computer 1000 includes a memory 1010 and a CPU 1020. The computer 1000 includes a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a RAM 1012. For example, the ROM 1011 stores therein a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disc is inserted to the disk drive 1100. For example, the serial port interface 1050 is connected to a mouse 1110 and a keyboard 1120. For example, the video adapter 1060 is connected to a display 1130.

For example, the hard disk drive 1090 stores an OS 1091, an application program 1092, a program module 1093, and program data 1094 therein. That is, computer programs defining the processing in the analysis device 10 are implemented as the program module 1093 in which computer-executable codes are written. For example, the program module 1093 is stored in the hard disk drive 1090. For example, the program module 1093 for executing the same processing as the functional configuration in the analysis device 10 is stored in the hard disk drive 1090. Note that the hard disk drive 1090 may be substituted by an SSD.

Setting data used for the processing in the above-mentioned embodiment is stored, for example, in the memory 1010 or the hard disk drive 1090 as program data 1094. The CPU 1020 reads the program module 1093 or the program data 1094 stored in the memory 1010 or the hard disk drive 1090 onto the RAM 1012 and executes the read program module or program data as needed.

Note that the program module 1093 and the program data 1094 are not limited to being stored in the hard disk drive 1090, and, for example, may be stored in a removable storage medium and read by the CPU 1020 through the disk drive 1100. Alternatively, the program module 1093 and the program data 1094 may be stored in another computer connected through a network (such as local area network (LAN) and wide area network (WAN)). The program module 1093 and the program data 1094 may be read by the CPU 1020 from another computer through the network interface 1070.

REFERENCE SIGNS LIST

10 ANALYSIS DEVICE
11 COMMUNICATION UNIT
12 INPUT UNIT
13 OUTPUT UNIT
14 STORAGE UNIT
15 CONTROL UNIT
141 OUTPUT LOG INFORMATION
142 DICTIONARY INFORMATION
151 CLASSIFICATION UNIT
152 CREATION UNIT
153 PATTERN EXTRACTION UNIT
154 REMOVAL UNIT
155 DETERMINATION UNIT
156 SIGNIFICANT LOG EXTRACTION UNIT
157 SEQUENCE EXTRACTION UNIT

The invention claimed is:

1. An analysis device, comprising:
a memory; and
a processor coupled to the memory and programmed to execute a process comprising:
classifying messages included in a text log output from a system, and giving an ID to each of the classified messages;
creating, based on dates when the messages occur, attached to the messages, a log matrix that is a matrix indicating an appearance distribution of the messages in the text log for each predetermined time period for each ID;
decomposing the log matrix, and extracting a basis matrix in which column vectors are patterns as combinations of the IDs and a weighting matrix in which row vectors indicate how frequently the patterns appear for each predetermined time period; and
removing a part or whole of the patterns from the log matrix in accordance with a matrix product formed in accordance with the basis matrix and the weighting matrix,
wherein the removing removes the patterns by subtracting, from the log matrix, any one of a product of the basis matrix and a significant weighting matrix obtained by replacing values of elements in each pattern in the weighting matrix smaller than a predetermined threshold with 0, a product of a significant basis matrix obtained by replacing values of elements in each pattern in the basis matrix smaller than a predetermined threshold with 0 and the weighting matrix, and a product of the significant basis matrix and the significant weighting matrix, or
wherein the removing uses any one of a product of the basis matrix and a non-significant weighting matrix obtained by replacing values of elements in each pattern in the weighting matrix equal to or larger than a predetermined threshold with 0, a product of a non-significant basis matrix obtained by replacing values of elements in each pattern in the basis matrix equal to or larger than a predetermined threshold with 0 and the weighting matrix, and a product of the non-significant basis matrix and the non-significant weighting matrix as a matrix obtained by removing the patterns from the log matrix.

2. The analysis device according to claim 1, wherein the decomposing decomposes the log matrix by non-negative matrix factorization.

3. The analysis device according to claim 1, wherein the extracting further extracts a pattern from the log matrix from which the patterns have been removed by the removing.

4. An analysis method to be executed by an analysis device, the analysis method comprising:
classifying messages included in a text log output from a system, and giving an ID to each of the classified messages;
creating, based on dates when the messages occur, attached to the messages, a log matrix that is a matrix indicating an appearance distribution of the messages in the text log for each predetermined time period for each ID;
decomposing the log matrix to extract a basis matrix in which column vectors are patterns as combinations of the IDs and a weighting matrix in which row vectors indicate how frequently the patterns appear for each predetermined time period; and
removing a part or whole of the patterns from the log matrix in accordance with a matrix product formed in accordance with the basis matrix and the weighting matrix,
wherein the removing removes the patterns by subtracting, from the log matrix, any one of a product of the basis matrix and a significant weighting matrix obtained by replacing values of elements in each pattern in the weighting matrix smaller than a predetermined threshold with 0, a product of a significant basis matrix obtained by replacing values of elements in each pattern in the basis matrix smaller than a predetermined threshold with 0 and the weighting matrix, and a product of the significant basis matrix and the significant weighting matrix, or
wherein the removing uses any one of a product of the basis matrix and a non-significant weighting matrix obtained by replacing values of elements in each pattern in the weighting matrix equal to or larger than a predetermined threshold with 0, a product of a non-significant basis matrix obtained by replacing values of elements in each pattern in the basis matrix equal to or larger than a predetermined threshold with 0 and the weighting matrix, and a product of the non-significant basis matrix and the non-significant weighting matrix as a matrix obtained by removing the patterns from the log matrix.

5. A non-transitory computer-readable recording medium having stored therein a program, for analysis, that causes a computer to execute a process comprising:
classifying messages included in a text log output from a system, and giving an ID to each of the classified messages;
creating, based on dates when the messages occur; attached to the messages, a log matrix that is a matrix indicating an appearance distribution of the messages in the text log for each predetermined time period for each ID;
decomposing the log matrix to extract a basis matrix in which column vectors are patterns as combinations of the IDs and a weighting matrix in which row vectors indicate how frequently the patterns appear for each predetermined time period; and removing a part or whole of the patterns from the log matrix in accordance with a matrix product formed in accordance with the basis matrix and the weighting matrix, wherein the removing removes the patterns by subtracting, from the log matrix, any one of a product of the basis matrix and a significant weighting matrix obtained by replacing values of elements in each pattern in the weighting matrix smaller than a predetermined threshold with 0, a product of a significant basis matrix obtained by replacing values of elements in each pattern in the basis matrix smaller than a predetermined threshold with 0 and the weighting matrix, and a product of the significant basis matrix and the significant weighting matrix, or wherein the removing uses any one of a product of the basis matrix and a non-significant weighting matrix obtained by replacing values of elements in each pattern in the weighting matrix equal to or larger than a predetermined threshold with 0, a product of a non-significant basis matrix obtained by replacing values of elements in each pattern in the basis matrix equal to or larger than a predetermined threshold with 0 and the weighting matrix_ and a product of the non-significant basis matrix and the non-significant weighting matrix as a matrix obtained by removing the patterns from the log matrix.

* * * * *